(12) United States Patent
Hiemstra et al.

(10) Patent No.: US 11,949,466 B1
(45) Date of Patent: Apr. 2, 2024

(54) BAND IDENTIFIER SYSTEM FOR WEARABLE DEVICES

(71) Applicant: Apple Inc., Cupertino, CA (US)

(72) Inventors: Daniel J. Hiemstra, San Jose, CA (US); Tengxing Wang, Foster City, CA (US); Erik G. De Jong, San Francisco, CA (US); Zaki Moustafa, Palo Alto, CA (US); Xinping Zeng, San Jose, CA (US); Vincent Chauvin, San Francisco, CA (US); Osamu Yabe, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/132,895

(22) Filed: Apr. 10, 2023

Related U.S. Application Data

(63) Continuation of application No. 17/883,421, filed on Aug. 8, 2022, now Pat. No. 11,652,509, which is a continuation of application No. 17/200,660, filed on Mar. 12, 2021, now Pat. No. 11,611,372.

(60) Provisional application No. 62/992,076, filed on Mar. 19, 2020, provisional application No. 62/989,527, filed on Mar. 13, 2020.

(51) Int. Cl.
| | |
|---|---|
| *H04B 5/00* | (2006.01) |
| *A44C 5/00* | (2006.01) |
| *G04G 17/04* | (2006.01) |
| *H01Q 1/27* | (2006.01) |
| *H01Q 7/00* | (2006.01) |
| *H04W 4/80* | (2018.01) |

(52) U.S. Cl.
CPC ............ *H04B 5/0025* (2013.01); *A44C 5/00* (2013.01); *A44C 5/0007* (2013.01); *G04G 17/04* (2013.01); *H01Q 1/273* (2013.01); *H01Q 7/00* (2013.01); *H04B 5/0081* (2013.01); *H04W 4/80* (2018.02)

(58) Field of Classification Search
CPC ..... H04B 5/0025; H04B 5/0081; H04W 4/80; A44C 5/00; G04G 17/04
See application file for complete search history.

(56) References Cited

U.S. PATENT DOCUMENTS

| | | | |
|---|---|---|---|
| 3,973,706 | A | 8/1976 | Boyce et al. |
| 5,361,241 | A | 11/1994 | Ferrara et al. |
| 8,478,195 | B1 | 7/2013 | Hewinson |
| 8,725,842 | B1 | 5/2014 | Al-Nasser |

(Continued)

FOREIGN PATENT DOCUMENTS

| | | |
|---|---|---|
| DE | 3813409 | 11/1989 |
| WO | WO 2014/134497 | 9/2014 |
| WO | WO 2015/047363 | 4/2015 |

*Primary Examiner* — David Bilodeau
(74) *Attorney, Agent, or Firm* — BAKERHOSTETLER

(57) ABSTRACT

Wearable electronic devices, such as smart watches, can be provided with a band for securing the device to a wearer. The device and the band can include near-field communications (NFC) components that allow the device to uniquely identify the band. Device operations such as the color, theme, or content displayed on the device can be based, in part, on the identification of a particular band. The band may include a miniature NFC tag in an attachment portion of the band that is configured to be received in a recess in a housing of the device. An NFC module for reading the NFC tag can be provided within the recess of the housing, so that the attachment portion of the band and the recess in the device housing position and align the NFC tag with the NFC module when the band is attached to the device.

20 Claims, 24 Drawing Sheets

(56) References Cited

U.S. PATENT DOCUMENTS

| | | |
|---|---|---|
| 9,553,625 B2 | 1/2017 | Hatanaka et al. |
| 10,691,072 B1 | 6/2020 | Johnson |
| 11,222,336 B1 | 1/2022 | Aidasani et al. |
| 2015/0015502 A1 | 1/2015 | Al-Nasser |
| 2015/0195009 A1 | 7/2015 | Wang |
| 2016/0262028 A1 | 9/2016 | Reddy et al. |
| 2018/0059714 A1 | 3/2018 | Martin |
| 2018/0072267 A1 | 3/2018 | Shim |
| 2018/0210491 A1 | 7/2018 | Song |
| 2018/0294553 A1 | 10/2018 | Lim |
| 2019/0341677 A1 | 11/2019 | Hsu |
| 2021/0050882 A1 | 2/2021 | Jia |

BAND IDENTIFIER SYSTEM FOR WEARABLE DEVICES

CROSS REFERENCE TO RELATED APPLICATIONS

This application is a continuation of U.S. patent application Ser. No. 17/883,421, entitled "Band Identifier System For Wearable Devices," filed on Aug. 8, 2022, which is a continuation of U.S. patent application Ser. No. 17/200,660, entitled "Band Identifier System For Wearable Devices," filed on Mar. 12, 2021, which claims the benefit of priority to U.S. Provisional Patent Application No. 62/992,076, entitled "Band Identifier System For Wearable Devices," filed on Mar. 19, 2020 and U.S. Provisional Patent Application No. 62/989,527, entitled "Identification of Watch Bands," filed on Mar. 13, 2020, the disclosure of each of which is hereby incorporated herein in its entirety.

TECHNICAL FIELD

The present description relates generally to wearable devices, and, more particularly, to band identifier systems for wearable devices.

BACKGROUND

A variety of wearable electronic devices, including smart watches, have been developed that include components to provide a variety of functions. For example, some wearable electronic devices include one or more sensors to measure various characteristics of the user and/or the environment in which the device operates. Such devices may include a display to indicate the time, date, or other device features. The devices may also include accelerometers and one or more sensors that enable a user to track fitness activities and health-related characteristics, such as heart rate, blood pressure, and body temperature, among other information. The devices also typically include a rechargeable battery that powers the electronics within the device, and a mechanical strap or band for securing the device to a user.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
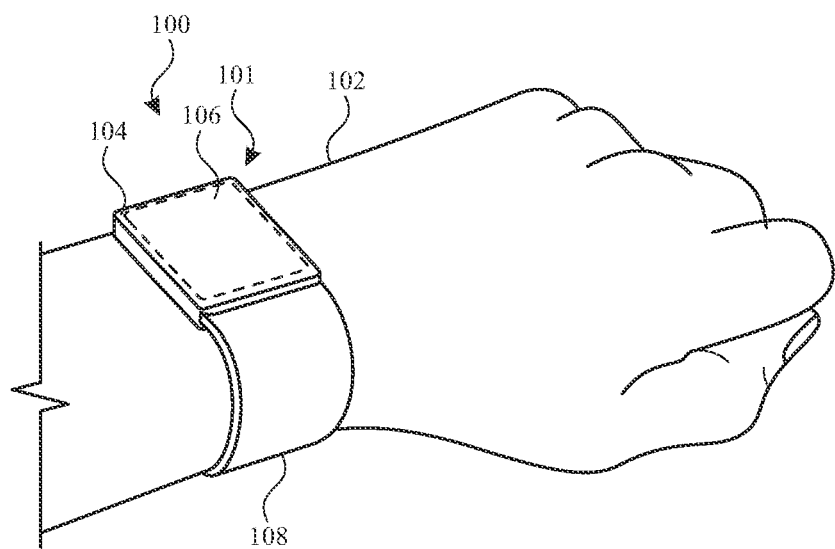
FIG. 1 illustrates a perspective view of a wearable electronic device implemented as a watch on a wrist of a user, in accordance with aspects of the disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Wearable electronic devices such as smart watches can include a main body formed in part by a device housing in which components such as sensors, processing circuitry, memory, a battery, and/or other hardware are enclosed. The main body may include a display mounted to the housing such that the housing and the display form an enclosure for the components. The display can be controlled to display a home screen such as a watch face (e.g., including an indicator of time, an indicator of the date, an activity indicator, or any other information), and/or user interfaces for one or more applications that can be executed on the device. The home screen and/or user interfaces can be displayed with a theme or a color palette selected by the user or generated automatically by the device.

To secure a wearable electronic device to the body of a user, one or more straps or bands can be coupled to the housing of the main body. The straps or bands can be removable and/or replaceable. Users can replace the straps or bands for various reasons. As examples, a user may remove a band of one color to replace the band with a band of another color (e.g., to match the user's outfit or mood), or may replace a band of one type with a band of another type (e.g., to replace a fashion band worn during the workday with sport band for a workout). However, because the home screen and user interfaces displayed on the display of the wearable electronic device are also customized and/or thematic, the new band may clash or otherwise be contradictory or incompatible with the content displayed by the device.

The systems and methods disclosed herein provide a band identification system for a wearable electronic device that allows a wearable electronic device to uniquely identify a band that is coupled to a main body of the device. The systems and methods disclosed herein may include near-field communications components that allow a wearable electronic device to uniquely identify and/or obtain other information from a band that is coupled to a main body of the device without requiring a power source to be provided in the band. The systems and methods disclosed herein allow a wearable electronic device to uniquely identify and/or obtain other information from a band that is coupled to a main body of the device while maintaining the structural integrity of a housing of the device, including preventing ingress of moisture or fluid to internal cavities of the device.

Upon identification of a particular band using the near-field communications components of the band identification system, one or more components and/or features of the wearable electronic device can be modified to correspond to the identified band. For example, the color palette or theme of displayed content can be changed, without user input, to match one or more colors of an identified band. In another example, upon identification of a fitness band, a fitness application or a fitness related home screen can be displayed by the wearable electronic device. In another example, upon identification of or removal of a swim band, water protection features such as water purging features of the device can be activated.

The band identification systems and methods described herein may also facilitate identification of authorized and/or unauthorized bands for a wearable electronic device. For example, third party bands may be unauthorized bands that are advertised for use with a particular wearable electronic device, but may not properly secure to the device, which can cause a risk of damage to the device. Upon determination that a band that is coupled to the device is not an authorized band, a warning may be provided using an output component of the device, and/or one or more features of the device may be disabled or otherwise modified. In another example, a particular band may be associated with a particular application or service on the wearable electronic device. Upon identification of a band that is associated with a particular application or service on the wearable electronic device, the device may activate or provide access to features associated with that application or service.

The systems and methods disclosed herein may also facilitate identification by a wearable electronic device of one or more characteristics of a band. The characteristics of the band may include the color, shape, or style of the band and/or a capability of the band. For example, in some implementations, a band may include one or more band components that provide various capabilities for the band. Band components may include, as examples, one or more sensors (e.g., environmental sensors, biometric sensors, gesture sensors, inertial sensors, or the like), processing circuitry, additional communications circuitry, input components, audio and/or haptic output components, a battery, and/or one or more display components. The systems and methods disclosed herein may include near-field communications components that enable a wearable electronic device to identify, access, power, and/or utilize the band components (e.g., to add additional capability for the wearable electronic device).

These and other features of the disclosed systems and methods are discussed below with reference to FIGS. 1-21. However, those skilled in the art will readily appreciate that the detailed description given herein with respect to these Figures is for explanatory purposes only and should not be construed as limiting.

FIG. 1 depicts a perspective view of a wearable electronic device that is secured to a body of a user. In the example of FIG. 1, a wearable electronic device 100 is implemented as a smart watch that is attached by a band 108 to a wrist 102 of a user. However, it should be appreciated that wearable electronic device 100 can be implemented differently from the example shown in FIG. 1. For example, a smart phone, a gaming device, a digital music player, a sports accessory device, a medical device, a navigation assistant, an accessibility device, a device that provides time and/or weather information, a health assistant, and/or other types of electronic devices can be secured to various parts of a body of a user by a band 108. Band 108 may be formed from one or more materials such as fabric, metal, plastic, rubber, and/or a combination of these or other materials.

As shown in FIG. 1, wearable electronic device 100 includes a housing 104 and a display 106. Housing 104 can form an outer surface or partial outer surface and protective case for one or more internal components of wearable electronic device 100. In the example of FIG. 1, housing 104 is formed into a substantially rectangular shape, although this configuration is not required and other shapes are possible in other implementations.

In some examples, the display 106 may incorporate an input device configured to receive user input. The display 106 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. Display 106 may include a transparent rigid outer layer that forms a portion of the outer surface of wearable electronic device 100. The transparent rigid outer layer may, for example, be a protective cover glass formed from a rigid and scratch resistant material such as ion-implanted glass, laminated glass, or sapphire. Display 106 may be mounted to housing 104 such that display 106 and housing 104 combine to form a main body 101 of wearable electronic device 100 and to form an enclosure in which the internal components of wearable electronic device 100 are housed.

Figure 2:
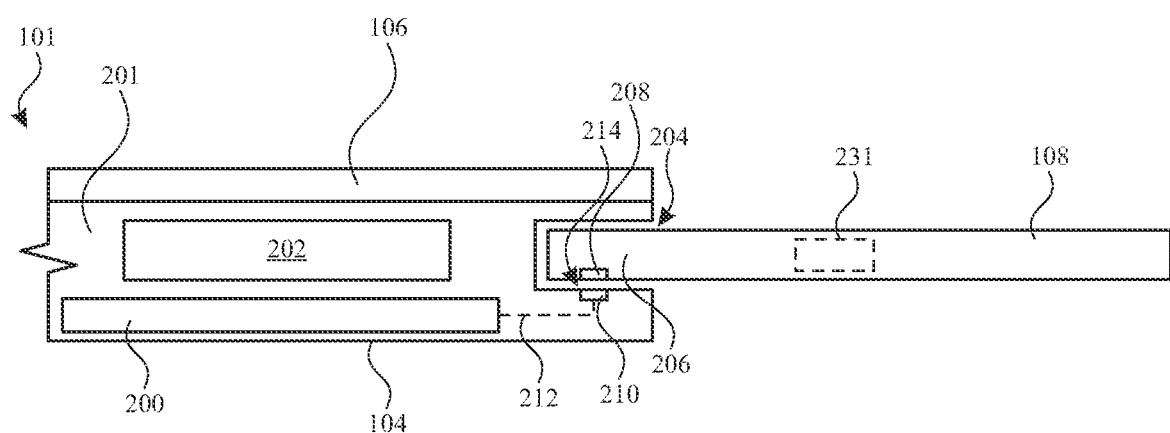
FIG. 2 illustrates a cross-sectional side view of a wearable electronic device, in accordance with aspects of the disclosure.

FIG. 2 illustrates a cross-sectional view of a portion of wearable electronic device 100 at which band 108 is coupled to housing 104. As shown in FIG. 2, internal components of wearable electronic device 100, such as processing circuitry 200 (e.g., a printed circuit board and/or one or more integrated circuits) and a battery 202 can be housed within an enclosure formed by housing 104 and display 106. The enclosure may form a water-resistant or water-proof cavity 201 for the internal components that allow wearable electronic device 100 to be worn underwater (e.g., to a depth of 10 meters, 20 meters, 50 meters, 100 meters, 150 meters, or 200 meters) without allowing fluid or moisture ingress into cavity 201.

FIG. 2 also shows how housing 104 may include a recess 204 that is shaped and sized to receive an attachment portion 206 of band 108. Attachment portion 206 of band 108 may be secured within recess 204 by a friction fit and/or by one or more engagement members of housing 104 and/or band 108. Attachment portion 206 may be integrally formed with the rest of band 108 (e.g., and formed from a common material) or attachment portion 206 may be formed from a different material from the rest of the band 108 (e.g., and permanently secured to the rest of band 108 or coupled to the rest of band 108 at an adjustable interface, such as by looping through an opening in attachment portion 206).

As shown in FIG. 2, a near-field communications (NFC) module 210 (also referred to herein as a near-field communications component) can be mounted to housing 104 at a location near or within recess 204. Band 108 may include a corresponding NFC module 208. When attachment portion 206 of band 108 is secured within recess 204, recess 204 and attachment portion 206 of band 108 may position NFC module 210 of main body 101 in alignment with NFC module 208 in band 108 and within a distance 214 that allows NFC module 210 to read a tag of NFC module 208 to obtain a unique identifier for band 108 and/or other information (e.g., identifiers of one or more characteristics and/or capabilities) for band 108. For example, power may be provided to NFC module 210 (e.g., from processing circuitry 200 such as via a connector such as a flexible printed circuit 212, a wire bond, or any other suitable connector) to allow an antenna element of NFC module 210 to wirelessly activate a corresponding antenna element of NFC module 208 to transmit a unique identifier of band 108 and/or other information for band 108 to processing circuitry 200 via NFC module 210. Upon identification of band 108, processing circuitry 200 may modify the operation of display 106 and/or other components and/or features of wearable electronic device 100 based on the particular band that is identified. Although various examples are described herein in which NFC module 208 and NFC module 210 cooperate to transmit an identifier of a band 108 to wearable electronic device 100, it should be appreciated that NFC module 208 can store and/or transmit other information for band 108 (e.g., one or more characteristics of band 108 such as one or more capabilities of band 108 that are associated with one or more (optional) band components 231 of band 108) to wearable electronic device 100, and/or that NFC module 210 can be operated to provide power and/or control signals to one or more components of band 108.

In the example of FIG. 2, a wearable device system is shown that includes a main body 101 that includes a device housing 104, processing circuitry 200 disposed within the device housing 104, a recess 204 on an edge of the device housing 104, and a first near-field communications module 210 mounted within the device housing 104 adjacent to the recess 204. The wearable device system shown in FIG. 2 also includes a removable band 108 that is configured to secure the main body 101 to a wearer, the removable band including an attachment portion 206 configured to be received in the recess 204 in the device housing 104 to removeably attach the removable band 108 to the main body 101, and a second near-field communications module 208 at least partially embedded within the attachment portion 206. FIG. 2 illustrates an attached configuration for the removable band 108, in which the attachment portion 206 of the removable band 108 and the recess 204 in the device housing 104 are configured to align the first near-field communications module 210 with the second near-field communications module 208. For example, the attachment portion 206 of the removable band 108 and the recess 204 in the device housing 104 may be configured to position a first antenna of the first near-field communications module 210 at a predetermined distance of less than one millimeter from a second antenna of the second near-field communications module 208.

Figure 3:
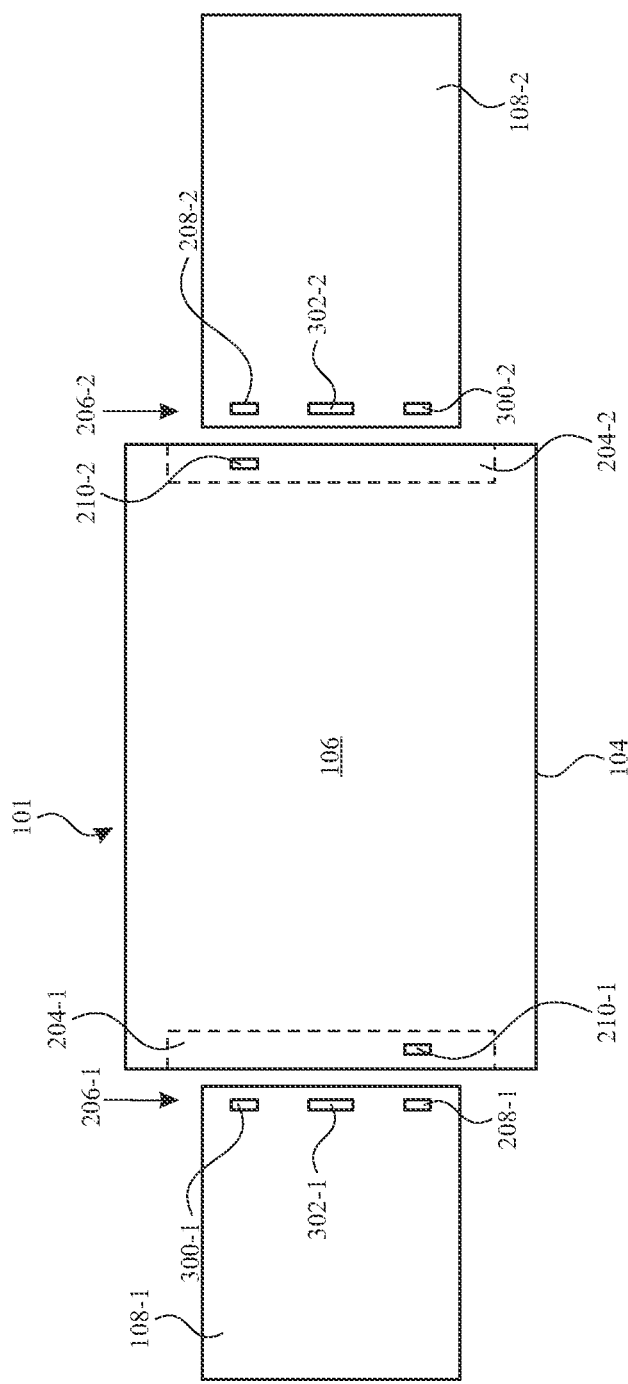
FIG. 3 illustrates a top view of a wearable electronic device system, in accordance with aspects of the disclosure.

FIG. 3 illustrates a top view of a wearable device system with wearable electronic device 100 in a configuration in which two bands 108-1 and 108-2 are positioned for attachment to housing 104 of main body 101. Band 108-1 and 108-2 may each extend to a free end (not explicitly shown) configured to wrap around the wrist (or other body portion) of the user and attach to the free end of other of band 108-1 and 108-2 to secure wearable electronic device 100 to the user.

As shown, band 108-1 and 108-2 may be arranged to be received in corresponding recesses 204-1 and 204-2 on opposing sides of housing 104. In the example of FIG. 2, band 108-1 includes an NFC module 208-1 configured for alignment with a first NFC module 210-1 in recess 204-1, and band 108-2 includes an NFC module 208-2 configured for alignment with a second NFC module 210-2 in recess 204-2. NFC modules 208-1 and 208-2 may include a common tag that uniquely identifies the pair of bands 108-1 and 108-2, or NFC modules 208-1 and 208-2 may each include a tag that uniquely identifies the band 108-1 or 108-2 in which that NFC module is disposed. For example, if NFC modules 208-1 and 208-2 each include a tag that uniquely identifies the band 108-1 or 108-2 in which that NFC module is disposed, a user of wearable electronic device 100 can mix and match different pairs of bands and wearable electronic device 100 can respond accordingly. For example, if wearable electronic device 100 identifies band 108-1 as a yellow band and band 108-2 as a green band, processing circuitry 200 can modify the theme of a displayed watch face to include a yellow-to-green color gradient across the display in the direction from band 108-1 to 108-2.

Although both bands 108-1 and 108-2 are provided with a corresponding NFC element in FIG. 3, it should be appreciated that, in some implementations, a single NFC module can be provided in a single band to identify that band or a pair of bands. Although an arrangement with two bands 108-1 and 108-2 that attach to each other at free ends thereof is shown in FIG. 3, it should be appreciated that, in some implementations, a single continuous (e.g., stretchable band that can expand and/or contract to fit on a user's wrist) can be coupled to main body 101 and identified with a single NFC module 208.

In the example of FIG. 3, each of band 108-1 and 108-2 includes additional features. Band 108-1 of FIG. 3 includes a bumper 300-1 and an engagement member 302-1. Band 108-2 of FIG. 3 includes a bumper 300-2 and an engagement member 302-2. Bumpers 300-1 and 300-2 may be passive members embedded or partially embedded in bands 108-1 and 108-2 respectively, that facilitate movement of bands 108-1 and 108-2, respectively, into and/or out of recesses 204-1 and 204-2. For example, in configurations in which bands 108-1 and 108-2 are formed from a soft or flexible material (e.g., rubber), bumpers 300-1 and 300-2 may be rigid (e.g., plastic or metal) bumpers that help bands 108-1 and 108-2 slide within recesses 204-1 and 204-2. As another example, in configurations in which bands 108-1 and 108-2 are formed from a rigid material (e.g., metal), bumpers 300-1 and 300-2 may be soft or flexible (e.g., rubber) bumpers that help prevent bands 108-1 and 108-2 from slipping too easily within recesses 204-1 and 204-2. Engagement members 302-1 and 302-2 may be actuable members that can be extended to secure bands 108-1 and 108-2 in recesses 204-1 and 204-2 or retracted to allow bands 108-1 and 108-2 to slide out of recesses 204-1 and 204-2.

In various implementations, NFC modules 208-1 and 208-2 of band 108-1 and 108-2 include outer surfaces formed from substantially the same material as bumpers 300-1 and 300-2 and act as additional bumpers for bands 108-1 and 108-2 in addition to providing NFC identification of bands 108-1 and 108-2.

Figure 4:
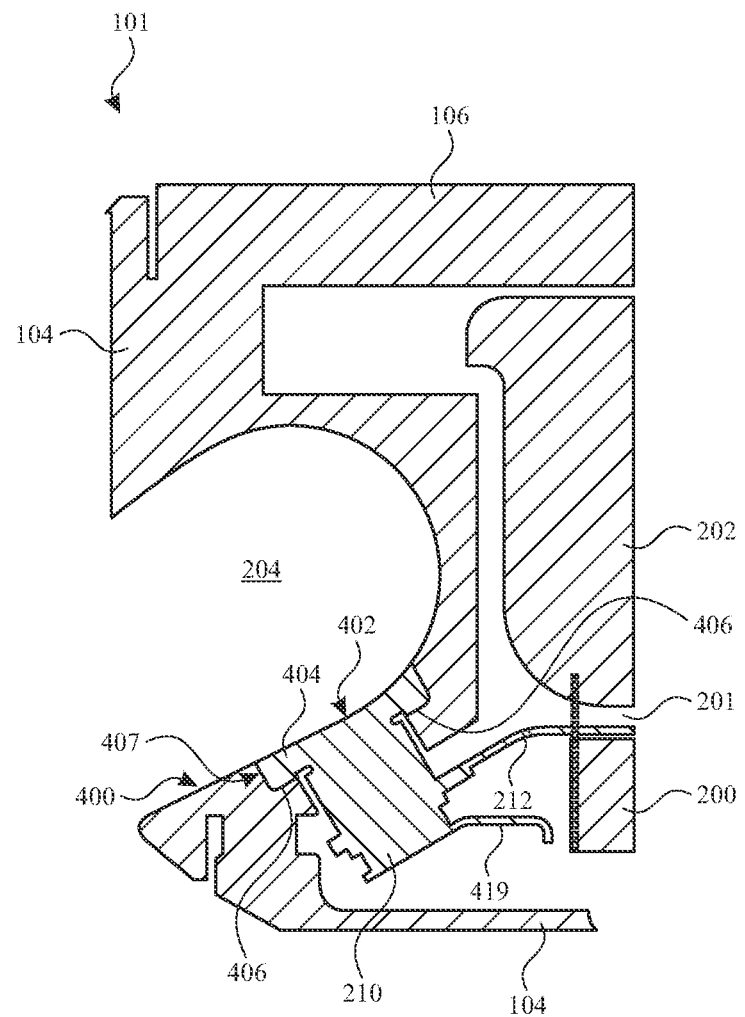
FIG. 4 illustrates a cross-sectional side view of a portion of a wearable electronic device, in accordance with aspects of the disclosure.

FIG. 4 illustrates a cross-sectional side view of a portion of main body 101, with the cross-section being taken through recess 204 and NFC module 210 in one implementation. In the example of FIG. 4, recess 204 has a curved surface 400, and NFC module 210 includes an interface portion 404 with an outer surface 402 that forms a portion of the surface 400 of recess 204. In the example of FIG. 4, outer surface 402 is substantially flush with the portions of surface 400 that are formed by housing 104. However, in other implementations, outer surface 402 may be recessed from surface 400, or may extend partially into recess 204 from surface 400 to press against an outer surface of NFC module 208 when a band 108 is installed in recess 204.

As can be seen in FIG. 4, NFC module 210 can be arranged in housing 104 so as to form a barrier between the environment external to main body 101 and a cavity 201 (e.g., a water-proof or water-resistant cavity) within main body 101. For this reason, interface portion 404 can be arranged to withstand a predetermined amount of pressure (e.g., one bar, two bar, three bar, five bar, at least five bar, or more than five bar) to provide the desired water resistance for wearable electronic device 100. For example, interface portion 404 can extend laterally beyond the footprint of NFC module 210 to rest against a ledge 406 on housing 104 within an opening 407 in the recess 204. In this arrangement, when water pressure from within recess 204 presses against surface 402, interface portion 404 is pressed against ledge 406 to resist the pressure.

In the example of FIG. 4, a cowling 419 can be seen that can provide additional support for NFC module 210 (e.g., by attachment of the cowling 419 to housing 104 such as by a screw or other attachment member). Cowling 419 may be arranged to provide a neutral force support for NFC module 210 (e.g., relative to recess 204) that does not apply pressure to NFC module 210 that could overcome an adhesive or other attachment mechanism between ledge 406 and interface portion 404, but that provides additional resistance to pressure such as water pressure on surface 402. In the example of FIG. 4, a connector implemented as a flexible printed circuit 212 communicatively couples NFC module 210 with processing circuitry 200 in cavity 201.

Figure 5:
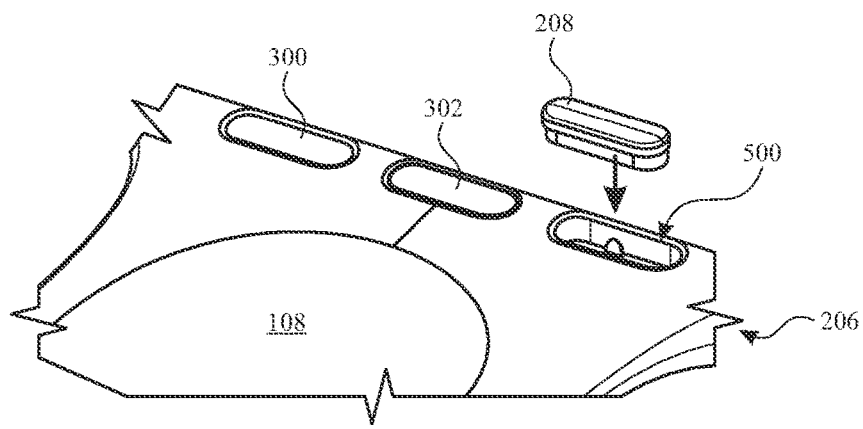
FIG. 5 illustrates a perspective view of a portion of a band for a wearable electronic device, in accordance with aspects of the disclosure.

FIG. 5 illustrates a perspective view of a portion of a band 108 in which a recess 500 is provided in the band NFC module 208. As shown, NFC module 208 can be installed in band 108 along with one or more passive band elements such as a bumper 300, and an engagement member 302. Bumper 300 may be formed from a material that is similar to, or the same as the material of a module housing for NFC module 208, so that bumper 300 (e.g., a passive bumper that is free of computing circuitry) and NFC module 208 (e.g., an active bumper that provides mechanical bumper functionality in addition to NFC tag functionality) provide surfaces that facilitate installation and/or removal of band 108 from recess 204 in housing 104. Engagement member 302 may be, for example, a spring-loaded or other resiliently compressible member that can snap into a corresponding notch within recess 204 to secure band 108 within the recess.

Figure 6:
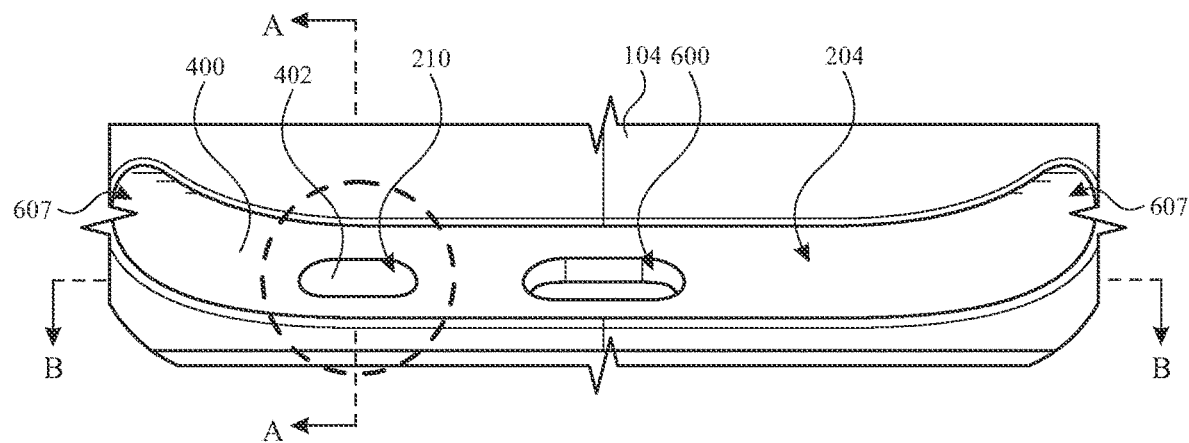
FIG. 6 illustrates a side perspective view of a portion of a housing of a wearable electronic device, in accordance with aspects of the disclosure.

For example, FIG. 6 illustrates an implementation of housing 104 in which a notch 600 is provided in recess 204 into which engagement member 302 of FIG. 5 can extend, when band 108 located within recess 204 such that engagement member 302 is aligned with notch 600.

In such a configuration in which band 108 has been extended into recess 204 such that engagement member 302 is aligned and engaged with notch 600, NFC module 208 in band 108 will also have been positioned in alignment with and opposed to NFC module 210 in recess 204. In this way, NFC module 210 and NFC module 208 are positioned (e.g., with aligned antennas separated by a predetermined distance) such that NFC module 210 can generate a NFC signal that inductively causes NFC module 208 in band 108 to transmit a unique identifier for band 108 back to NFC module 210.

In the example of FIG. 6, recess 204 has a length that extends along an edge of housing 104 (e.g., the device housing of wearable electronic device 100) and is open at opposing ends 607 of the length. In this configuration, recess 204 is configured to receive the attachment portion 206 of removable band 108 from an end (e.g., one of ends 607) of the recess, along the length of the recess. NFC module 208 may form an active bumper for band 108, the active bumper configured to slide along surface 400 of recess 204 as attachment portion 206 is received from the end of the recess along the length of the recess.

Figure 7:
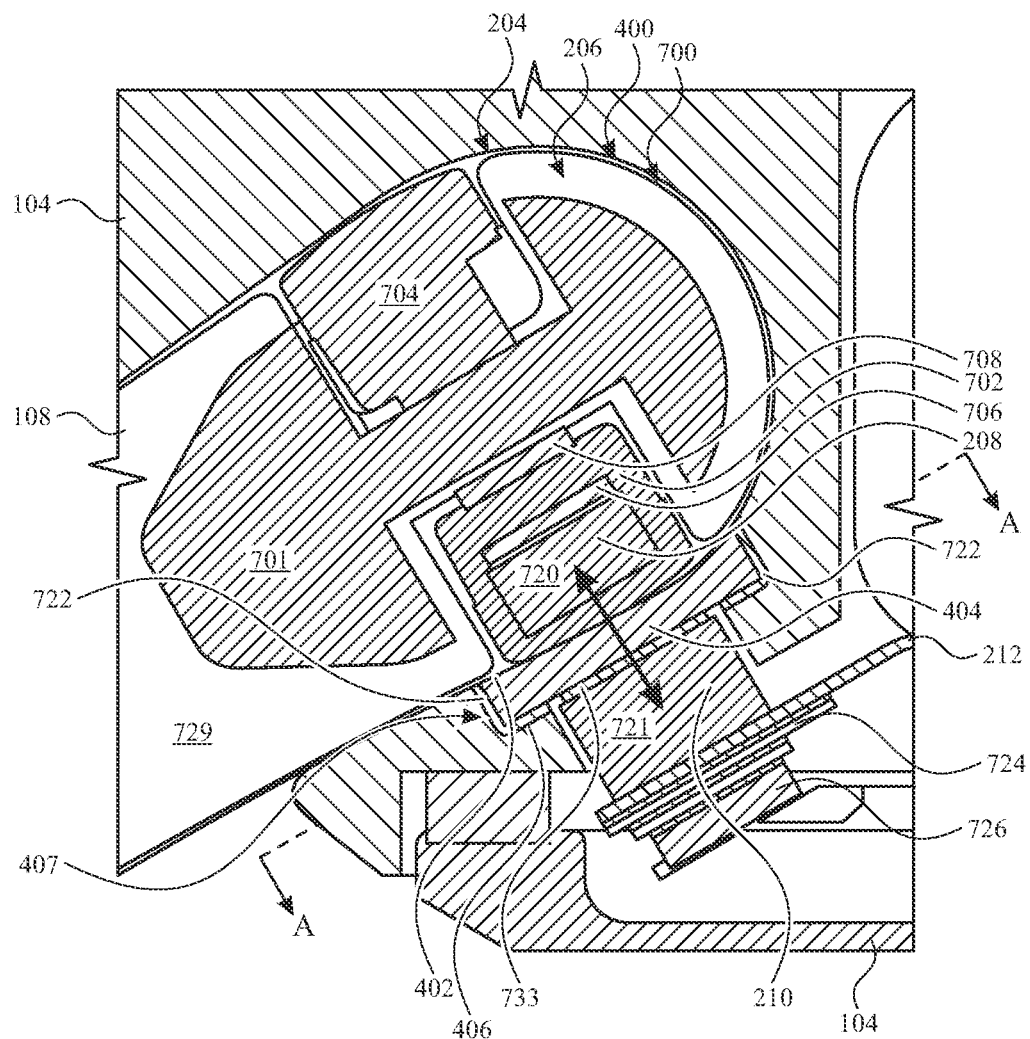
FIG. 7 illustrates a cross-sectional side view of a portion of a wearable electronic device with a band secured to the housing of the device, in accordance with aspects of the disclosure.

FIG. 7 shows a cross-sectional view of a portion of device 100, the cross-section taken along line A-A of FIG. 6, in an attached configuration in which attachment portion 206 of the band 108 of FIG. 5 has been installed in recess 204 of housing 104 (e.g., by sliding attachment portion 206 of band 108 into recess 204 along a direction parallel to the elongate dimension of recess 204). As shown in FIG. 7, attachment portion of band 108 is formed from a material 729. Material 729 may include, for example, a rubber, a flouroelastomer, leather, a fabric such as a woven nylon, a metal, or any combination of these or other materials. As shown in FIG. 7, attachment portion 206 may have an outer surface 700 with a shape that corresponds to the shape of surface 400 of recess 204.

In the example of FIG. 7, NFC module 208 includes a band module housing 702 that is attached within recess 500 in band material 729 by an adhesive 708. An antenna 720 and a memory chip 706 are disposed within the band module housing 702 such that antenna 720 of NFC module 208 is aligned with a corresponding antenna 721 of NFC module 210. As shown in FIG. 7, when band 108 of is installed in recess 204 of housing 104, an outer surface of band module housing 702 may be in contact with outer surface 402 of NFC module 210. In this configuration, antenna 720 is positioned in alignment with and sufficiently close to antenna 721 of NFC module 210 to be able transmit a unique identifier that is stored in memory 706 to NFC module 210 (e.g., when antenna 720 is powered via inductive coupling to antenna 721 of NFC module 210). Band module housing 702 may be formed from a material that is opaque to visible light and transparent to electromagnetic fields generated by antenna 720 and a corresponding antenna 721 in NFC module 210. Band module housing 702 may be formed from a material having a color that matches the color of one more passive bumpers in band 108 such as bumper 704 of FIG. 7 and/or bumper 300 of FIG. 3.

In the example of FIG. 7, band 108 includes a support structure 701 embedded within band material 729. Support structure 701 may provide rigid support for attachment portion 206 of band 108. As shown, support structure 701 may include two opposing recesses, corresponding to two opposing recesses in band material 729, within which NFC module 208 and an opposing bumper 704 (e.g., similar to bumper 300 of FIG. 3, but on an opposing side of band 108 from NFC module 208) can be positioned. As shown, when band 108 is installed in recess 204 of housing 104, an outer surface of bumper 704 may be in contact with a portion of the surface 400 of recess 204.

Additional details of NFC module 210 can also be seen in FIG. 7. For example, in the implementation illustrated in FIG. 7, NFC module 210 includes antenna 721 coupled to interface portion 404, which is implemented as a cap that is secured by adhesive 722 (e.g., a thermosetting polymer such as epoxy) to housing 104 (e.g., to ledge 406 and/or other portions of the opening 407 in recess 204). In the various implementations of NFC module 210 described herein, the cap (interface portion 404) may be formed, for example, from a material that is opaque to visible light and transparent to electromagnetic fields generated by antenna 721 and antenna 720 in NFC module 208. Band module housing 702 and/or the cap (interface portion 404) of NFC module 210 may be formed from a material that is electrically insulating so that the communicative coupling between band 108 and device 100 is an inductive (NFC) coupling without any direct conductive contact between NFC module 208 and NFC module 210.

Adhesive 733 is provided to attached an antenna assembly for antenna 721 to interface portion 404. A stiffener layer such as a glass-reinforced epoxy laminate layer is disposed on an opposing side of flexible printed circuit 212 to the side on which antenna 721 is mounted. A backing layer such as foam layer 726 can be provided at an interface between NFC module 210 and cowling 419.

Figure 8:
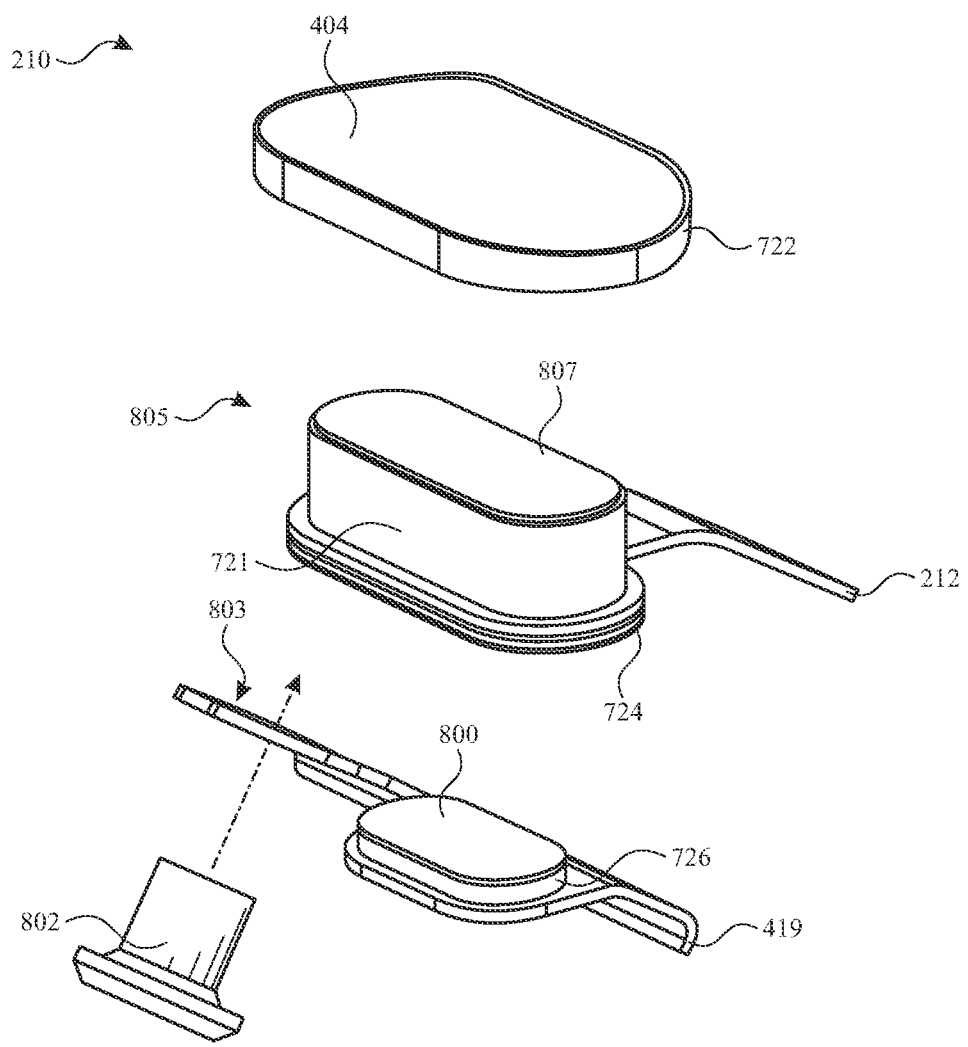
FIG. 8 illustrates a partially exploded perspective view of a near-field communications component for a housing of a wearable electronic device, in accordance with aspects of the disclosure.

FIG. 8 illustrates a partially exploded perspective view of the NFC module 210 of FIG. 7, showing how foam layer 726 can be mounted to cowling 419 and provided with an adhesive layer 800 for attachment to an antenna assembly 805 including antenna 721. In the example of FIG. 8, cowling 419 includes an opening 803 through which a fastener such as screw 802 can pass to secure cowling 419 to an interior surface of housing 104.

In the example of FIG. 8, antenna assembly 805 includes antenna 721 mounted to a portion of flexible printed circuit 212 that is supported by stiffener layer 724. An adhesive layer 807 is provided on antenna assembly 805 for attachment of antenna assembly 805 interface portion 404 (also referred to herein as a cap). Adhesive 722 for attaching interface portion 404 to ledge 406 of housing 104 is also shown. In the example of FIG. 8, antenna 721 may be implemented as a coil antenna, and can be provided with or without an insert (e.g., a plastic or magnetic core structure) around which the coil is wound. The coil antenna may be implemented as a wound coil or as a set of winding traces in an etched printed circuit board. However, it should be appreciated that the example NFC module of FIG. 8 is merely illustrative, and other implementations for NFC module 210 are contemplated herein.

Figure 9:
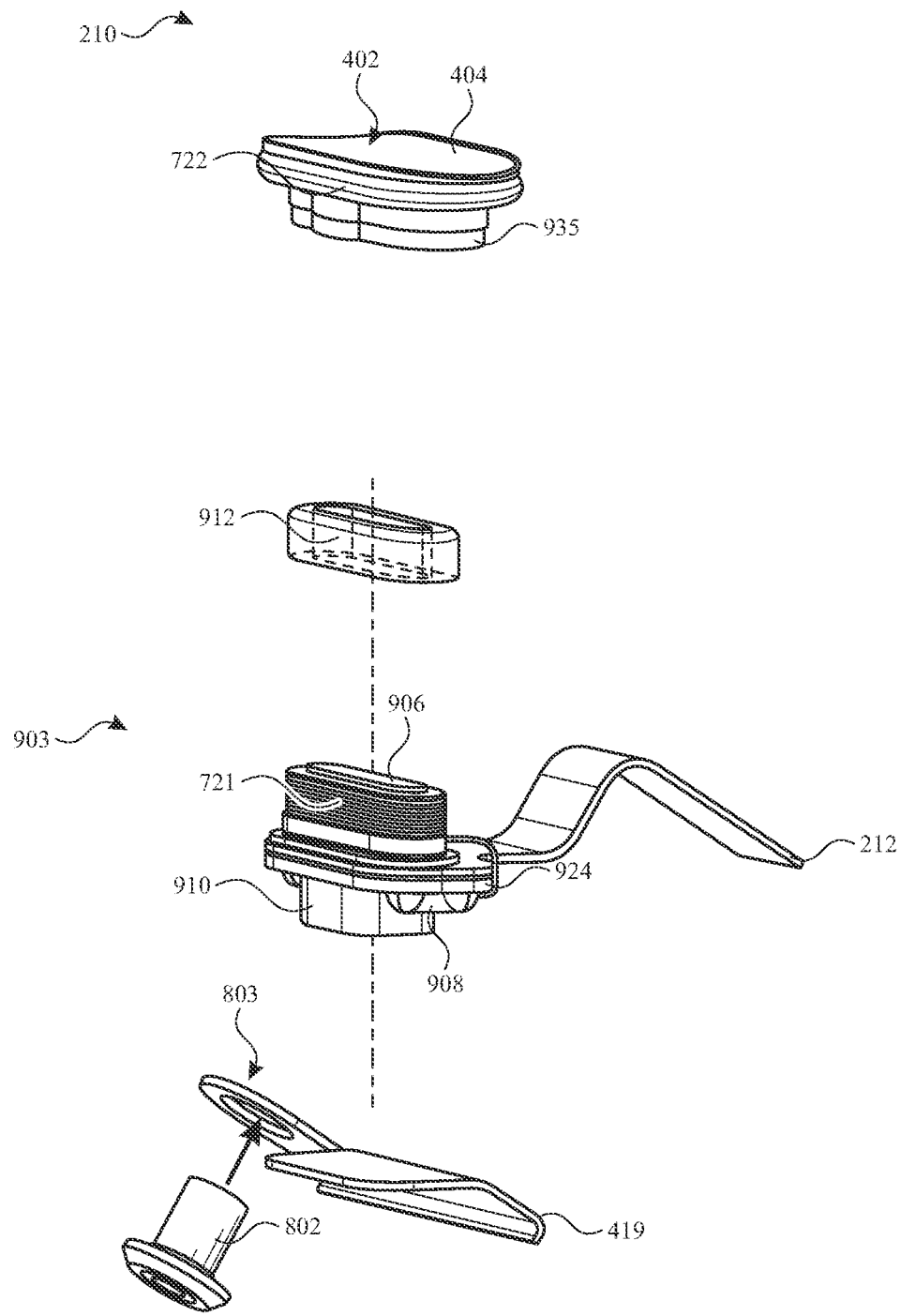
FIG. 9 illustrates a partially exploded perspective view of another near-field communications component for a housing of a wearable electronic device, in accordance with aspects of the disclosure.

For example, FIG. 9 illustrates a partially exploded perspective view of another implementation of NFC module 210. In the example of FIG. 9, NFC module 210 includes an antenna assembly 903 that includes antenna 721 implemented as a wound coil that is wound around a support structure such as a core structure 906. Core structure 906 may be a plastic structure that is provided primarily for support of antenna 721, or may be a magnetic (e.g., ferrite) core that supports antenna 721 and enhances the efficiency of antenna 721.

In the example of FIG. 9, antenna assembly 903 includes a portion of flexible printed circuit 212 that is supported by stiffener layer 924. Foam 910 is provided on stiffener layer 924, and one or more encapsulations 908 are also provided on stiffener layer 724 (e.g., to encapsulate leads for antenna 721 as described in further detail hereinafter).

In the example of FIG. 9, interface portion 404, which is implemented as a cap to be secured by adhesive 722 to housing 104 (e.g., to ledge 406 and/or other portions of the opening 407 in recess 204), includes an extended portion 935 configured to extend over an around antenna 721 and core structure 906 when NFC module 210 is assembled. A filler 912, such as a glue, adhesive, or potting material can be provided between interface portion 404 (also referred to herein as a cap) and antenna 721 to secure antenna assembly 903 to interface portion 404 and/or to fill the space between antenna assembly 903 and interface portion 404.

In the example of FIG. 9, near-field communications module 210 includes an interface portion 404 having an outer surface 402 shaped and sized to form a portion of a surface 400 of the recess 204 in the device housing 104 (e.g., as also illustrated in FIGS. 2, 4, 6, 7 discussed above and FIGS. 12 and 13 discussed hereinafter). In the examples of FIGS. 8 and 9, near-field communications module 210 may include a coil antenna 721 coupled between the interface portion 404 and a flexible printed circuit 212. In the example of FIG. 9, near-field communications module 210 includes a support structure such as a core structure 906 for the coil antenna, and the interface portion 404 includes an extended portion 935 that extends over and around the coil antenna 721 and a portion of the core structure 906.

Figure 10:
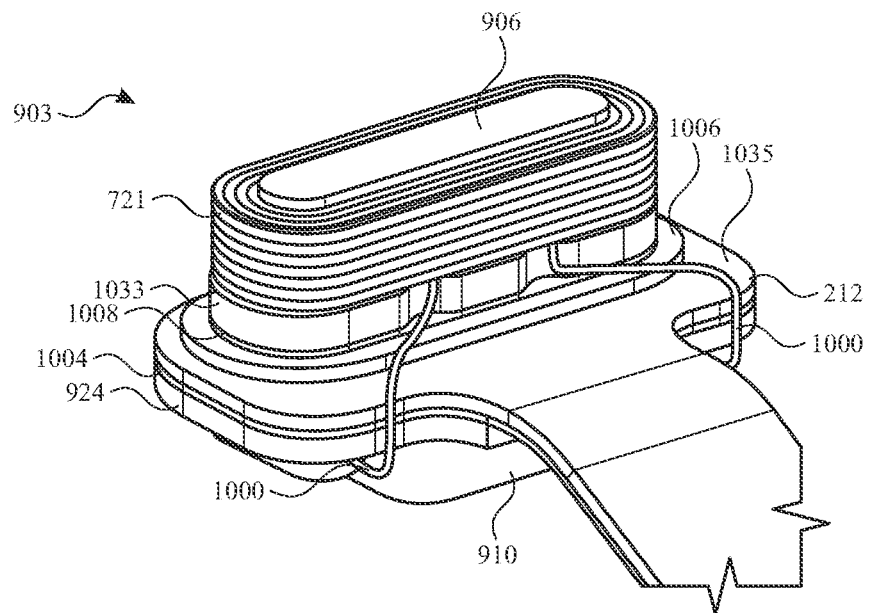
FIG. 10 illustrates an assembled top perspective view of an antenna module of the near-field communications component of FIG. 9, in accordance with aspects of the disclosure.

FIG. 10 illustrates a top perspective view of antenna assembly 903 of FIG. 9. As shown in FIG. 10, support structure 906 may include a base portion 1033 that is secured to a magnetic layer 1006 (e.g., a ferrite sheet) by a layer of adhesive 1008. Magnetic layer 1006 may be attached (e.g., using a layer of adhesive) to a surface 1035 of the portion of flexible printed circuit 212 that is supported by stiffener layer 924. Stiffener layer 924 may be attached to a portion of flexible printed circuit 212 by a layer of adhesive 1004. In this example, stiffener layer 924, and the portion of flexible printed circuit 212 that is supported by stiffener layer 924, form a part of antenna assembly 903.

FIG. 10 also shows how leads 1000 from antenna 721 can extend around an edge of flexible printed circuit 212 and stiffener layer 924 to terminate on a side of stiffener layer 924 that is opposite to the side on which antenna 721 is mounted (e.g., mounted via magnetic layer 1006 and adhesive 1008, and support structure 906).

Figure 11:
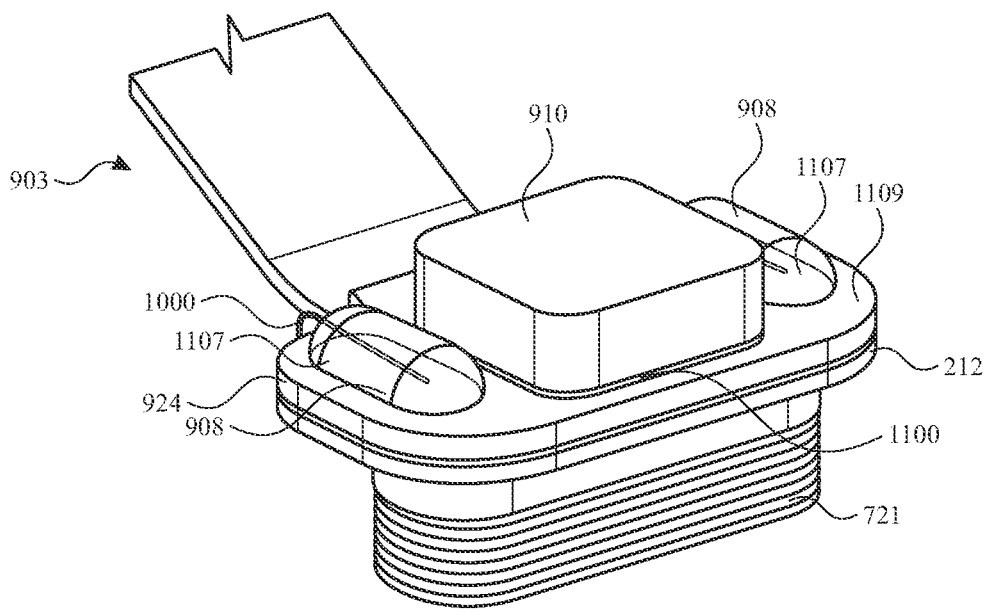
FIG. 11 illustrates an assembled bottom perspective view of the antenna module of the near-field communications component of FIG. 9, in accordance with aspects of the disclosure.

FIG. 11 illustrates a bottom perspective view of antenna assembly 903 of FIGS. 9 and 10, and shows how leads 1000 can terminate at landing pads 1107 on a bottom surface 1109 of stiffener layer 924. Encapsulations 908 are visible in FIG. 11 covering the ends of leads 1000 on surface 1109. Landing pads 1107 may, for example, be conductively coupled to one or more traces within flexible printed circuit 212 (e.g., by one or more conductive vias or other conductive structures or traces that extend through stiffener layer 924). Foam 910 may be attached to bottom surface 1109 of stiffener layer 924 by a layer of adhesive 1100.

Figure 12:
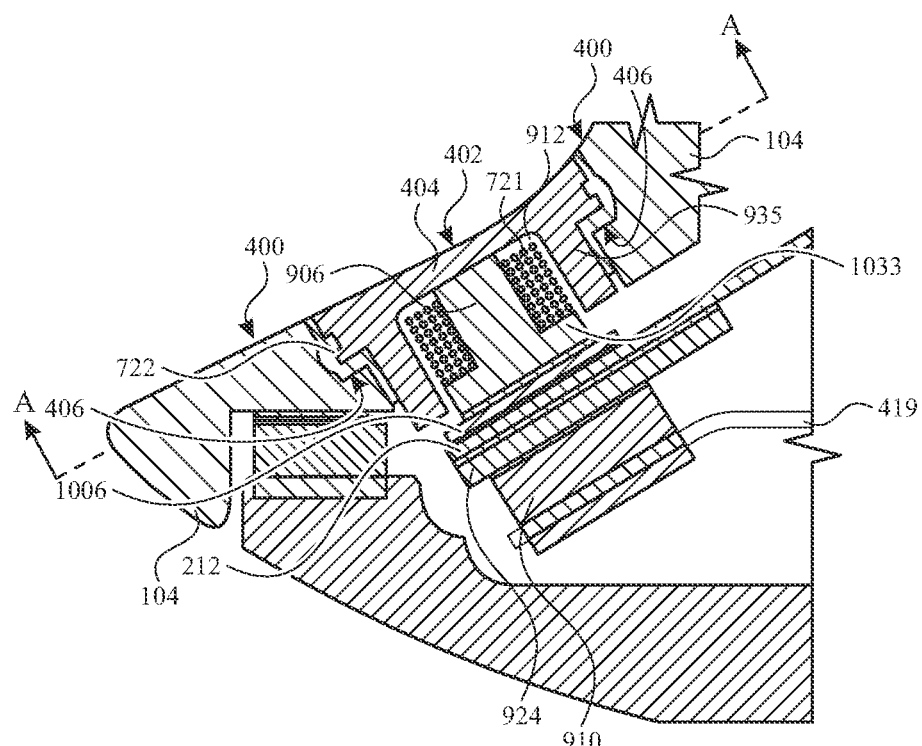
FIG. 12 illustrates a cross-sectional view of the near-field communications component of FIG. 9 installed in a housing of a wearable electronic device, in accordance with aspects of the disclosure.

FIG. 12 illustrates a cross-sectional view of a portion of device 100, taken along line A-A of FIG. 6, in an implementation in which NFC module 210 of FIG. 9 has been assembled and installed in housing 104 such that an outer surface 402 of interface portion 404 of forms a smoothly contiguous surface with surface 400 of recess 204 of housing 104, curving in coordination with curved portions of surface 400 in one or more dimensions. In the example of FIG. 12, interface portion 404 is secured to housing 104 by adhesive 722 that is disposed between various vertical and horizontal interfacing surfaces between interface portion 404 and an opening in housing 104, including between interface portion 404 and a ledge 406 within the opening in housing 104 for NFC module 210.

Ledge 406 provides support for interface portion 404 to counter, for example, forces on surface 402 that press NFC module 210 toward the interior of housing 104 (e.g., forces resulting from pressure from a band module housing pressed against surface 402 when a band is installed in recess 204, and/or fluid pressure such as water pressure on surface 402 when device 100 is submerged in water). As discussed herein, although not explicitly shown in FIG. 12, cowling 419 may be secured (e.g., by a screw 802) to housing 104 to further counter pressure that may be exerted on surface 402 (e.g., without providing an outward pressure on NFC module 210 that would overcome the attachment by adhesive 722).

In the example of FIG. 12, the device housing 104 includes an opening in the recess 204, the opening including a ledge 406, where part of the interface portion 404 is attached to the ledge 406 (e.g., as also illustrated in FIGS. 4 and 7 discussed above and in FIG. 13 discussed hereinafter). The interface portion 404 of near-field communications module 210 and ledge 406 of the opening in the recess 204 cooperate to seal an internal cavity (see internal cavity 201 of FIG. 2) of the main body 101 against (e.g., at least three bar) fluid pressure on the outer surface 402 of the interface portion 404.

Figure 13:
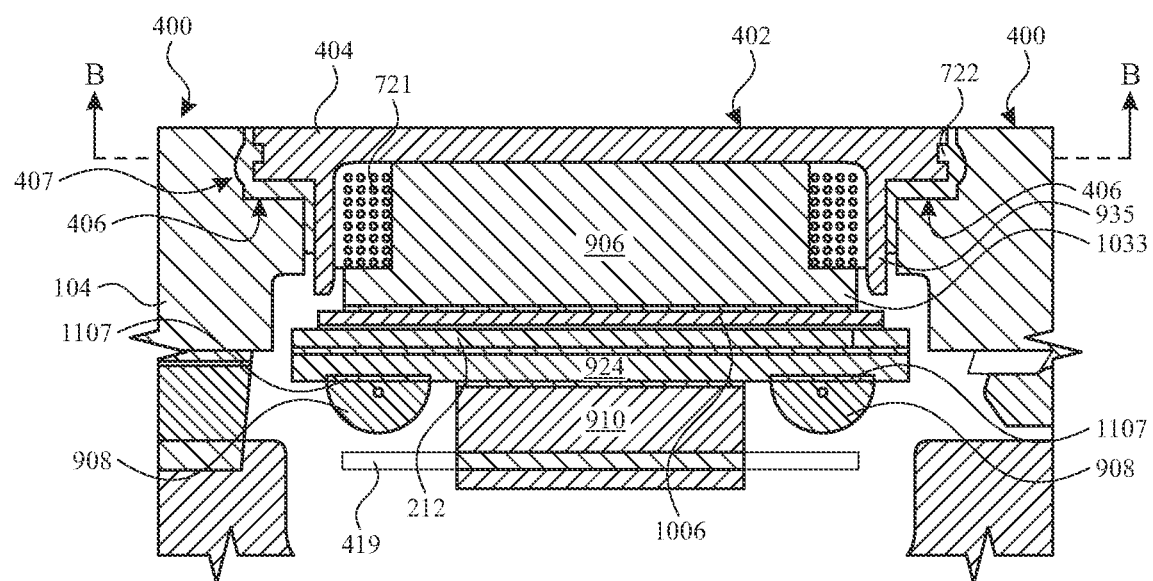
FIG. 13 illustrates another cross-sectional view of the near-field communications component of FIG. 9 installed in a housing of a wearable electronic device, in accordance with aspects of the disclosure.

FIG. 13 illustrates another cross-sectional view of a portion of device 100, taken along line B-B of FIG. 6. In the cross-sectional view of FIG. 13, landing pads 1107 on stiffener layer 724 can be seen. In the cross-sectional views of FIGS. 12 and 13, extended portion 935 of interface portion 404 can be seen extending over and around antenna 721 and support structure 906, with filler 912 therebetween. In one or more implementations, the interface portion 404 may inserted into the opening 407 from recess 204 and attached to the housing 104 by adhesive 722 prior to inserting the NFC module 210 into the interface portion (e.g., in an opposite direction to the insertion of interface portion 404 into the opening 407) and attaching the NFC module 210 to the interface portion 404 (e.g., using an adhesive such as filler 912). In one or more other implementations, the NFC module 210 may be attached to the interface portion 404 and inserted into the opening 407 with the interface portion 404 prior to attaching the flexible printed circuit 212 to the NFC module 210. In the example of FIGS. 12 and 13, antenna 721 is formed by eight layers of four turns of a wire wound around core structure 906, and supported by base portion 1033. However, this is merely illustrative, and other configurations for antenna 721 (e.g., more or fewer than four turns, more or fewer than eight layers, etc.) are contemplated.

As illustrated in the example of FIGS. 12 and 13, wearable electronic device 100 may be provided with a device housing 104, processing circuitry (see, e.g., processing circuitry 200 of FIG. 2) disposed within the device housing, a recess 204 on an edge of the device housing, and a near-field communications module 210 mounted within the device housing 104 adjacent to the recess 204 to read a unique identifier of a band 108 having a portion mounted in the recess, the band configured to secure the device housing to a wearer, the near-field communications module including an antenna assembly 903 (e.g., or antenna assembly 805 of FIG. 8), and an interface portion 404 having an outer surface 402 that forms a portion of a surface 400 of the recess 204. In the example of FIGS. 12 and 13, the antenna assembly 903 includes a coil antenna 721 that is wound around a core structure 906, where the interface portion 404 includes an extended portion 935 that extends over and around the coil antenna 721 and part of the core structure 906. In this example, the core structure 906 includes a base 1033, and the antenna assembly 903 also includes a magnetic layer 1006 attached to the base 1033. In this and other examples, the device further includes a flexible printed circuit 212 coupled between the antenna assembly 903 and the processing circuitry 200. In this and other examples, the antenna module further includes a stiffener layer 924 attached to a portion of the flexible printed circuit 212, and the stiffener layer 924 and the portion of the flexible printed circuit 212 each form a portion of the near-field communications module 210.

As illustrated in the example of FIGS. 12 and 13 (e.g., and/or FIGS. 4 and/or 7), the surface 400 of the recess 204 may have a curved shape, and the outer surface 402 of the interface portion 404 may have a shape that conforms to the curved shape of the surface of the recess to form a smoothly continuous portion of the surface of the recess.

In the cross-sections of FIGS. 12 and 13, it can be seen that extended portion 935 of interface portion 404 has an open bottom that allows extended portion 935 to extend over and around antenna 721 and at least part of core structure 906. The cross-sections of FIGS. 12 and 13 also illustrate how extended portion 935 runs around antenna 720 and core structure 906 in a direction substantially parallel to the wire that is wound around core structure 906 to form antenna 720.

Figure 14:
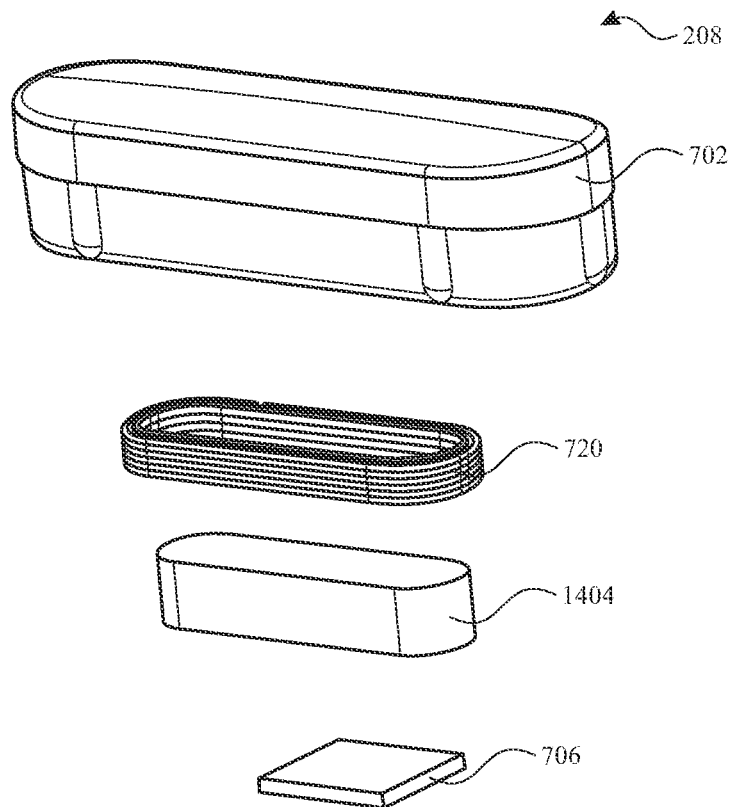
FIG. 14 illustrates an exploded perspective view of a near-field communications module for a band, in accordance with aspects of the disclosure.
Figure 15:
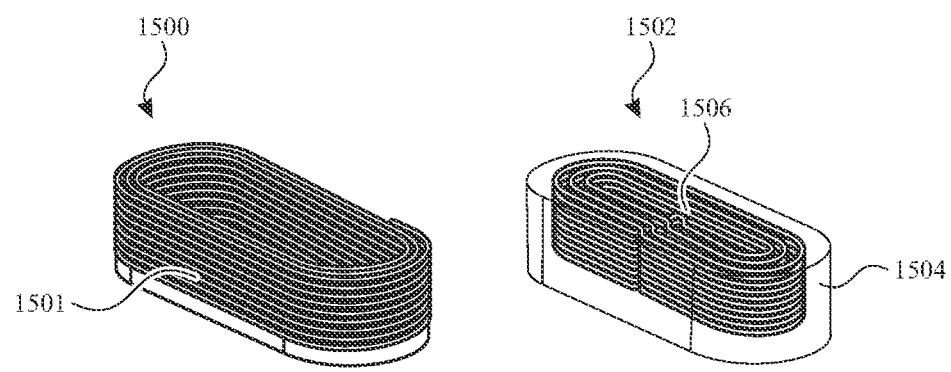
FIG. 15 illustrates perspective views of antenna elements that can be implemented in an antenna assembly, in accordance with aspects of the disclosure.

FIG. 14 illustrates an exploded perspective view of NFC module 208 of band 108, in one implementation. As shown in FIG. 14, NFC module 208 may include a band module housing 702, within which antenna 720, memory 706 (e.g., an NFC tag chip), and an antenna filler 1404 may be disposed. Antenna filler 1404 may be a plastic support structure or a magnetic (e.g., ferrite) structure that supports and/or enhances the efficiency of antenna 721. In the example of FIG. 14, antenna 720 is implemented as a wound coil. However, it should be appreciated that antenna 720 can be implemented in other configurations, such as by one or more winding traces in a printed circuit board. For example, FIG. 15 illustrates a wound coil antenna 1500 formed from one or more windings of a wire 1501, and an antenna 1502 formed from winding traces 1506 in a printed circuit board 1504. In various implementations, antenna 720 or antenna 721 can be implemented using either of antenna 1500 or antenna 1502 of FIG. 15.

Figure 16:
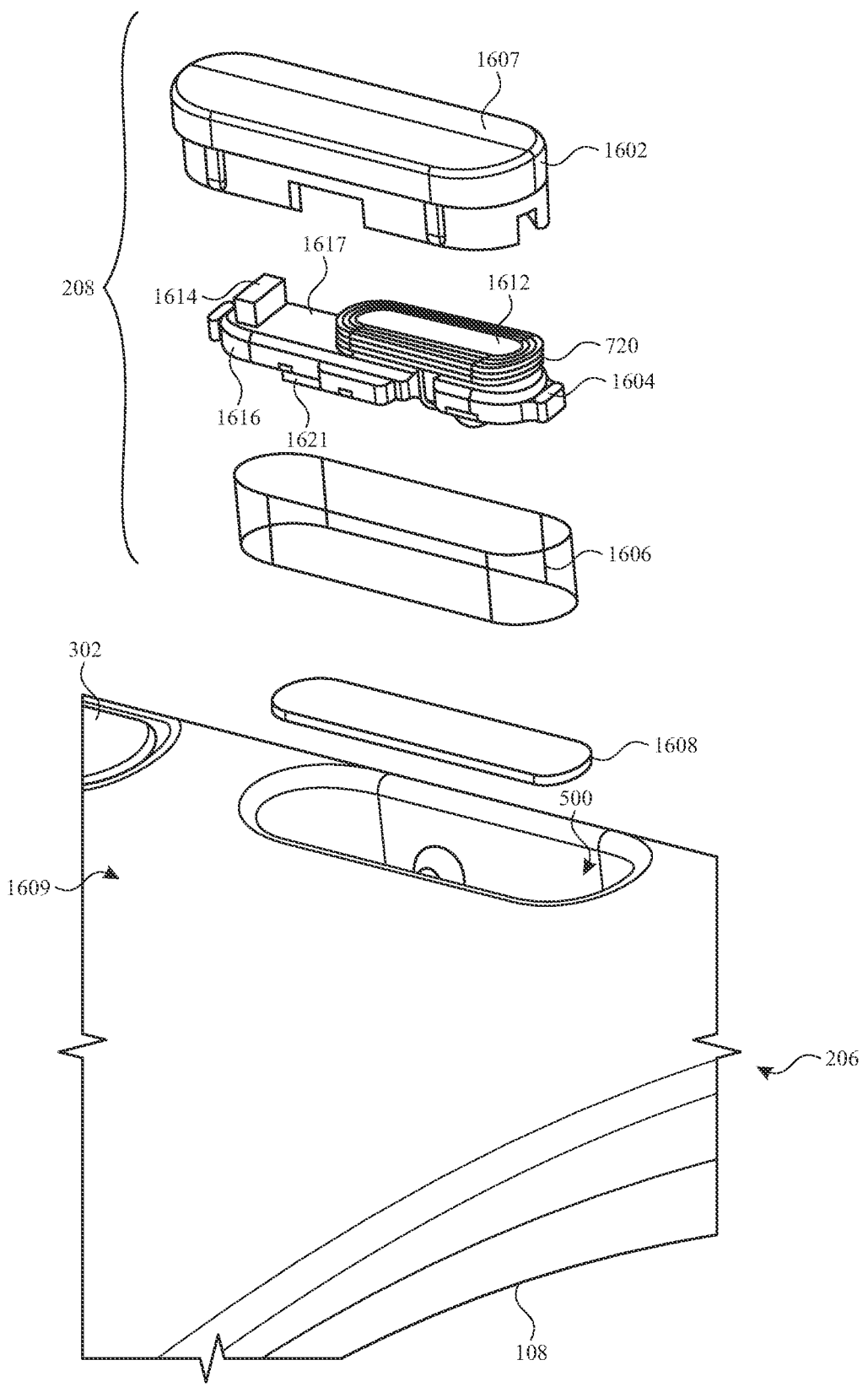
FIG. 16 illustrates a partially exploded top perspective view of another near-field communications module for a band, in accordance with aspects of the disclosure.

FIG. 16 illustrates a partially exploded perspective view of NFC module 208 in another implementation, and positioned for installation in recess 500 in attachment portion 206 of band 108. As shown in FIG. 16, in some implementations, NFC module 208 can include an antenna assembly 1604 configured to be secured within a band module housing 1602.

Band module housing 1602 may be formed from a hard or soft material in various implementations, and can serve as a housing for NFC module 208 and as a mechanical bumper for band 108 (e.g., a bumper that is spatially complementary to, and formed from the same material as a passive bumper 300 on the same side of band 108 and/or a passive bumper on an opposing side of band 108). For example, in implementations in which attachment portion 206 of band 108 is formed from a relatively soft material such as a rubber, flouroelastomer, leather, woven nylon, etc., band module housing 1602 may be formed from a relatively hard material such as a reinforced polymer (e.g., a glass fiber reinforced polymer). In implementations in which attachment portion 206 of band 108 is formed from a relatively hard material such as a metal (e.g., stainless steel), band module housing 1602 can be formed from a relatively soft material such as a rubber or a flouroelastomer.

Band module housing 1602 may be formed, for example, from a material that is opaque to visible light and transparent to electromagnetic fields generated by antenna 721 in NFC module 210 and antenna 720 in NFC module 208. Band module housing 1602 and/or the cap (interface portion 404) of NFC module 210 may be formed from a material that is electrically insulating so that the communicative coupling between band 108 and device 100 is an inductive (NFC) coupling (e.g., without any direct conductive contact between NFC module 208 and NFC module 210). This can be helpful in comparison with providing more complex circuitry (e.g., integrated circuits, displays, or the like) in a smart watch band that would either consume the limited power stored in the device and/or require larger and potentially bulky features in the band to accommodate power storage in the band. Band module housing 1602 may be formed from a material having a color that matches the color of one more passive bumpers in band 108 such as bumper 704 of FIG. 7 and/or bumper 300 of FIG. 3.

Antenna assembly 1604 can be secured within band module housing 1602 by an adhesive such as a glue 1606. Once assembled, NFC module 208 can be secured within recess 500 in band 108 by an adhesive 1608. Adhesive 1608 may be a pressure sensitive adhesive (PSA), an epoxy, or other adhesive material. In other implementations, NFC module 208 can be overmolded in the material of band 108 (e.g., attachment portion 206) or can be secured within recess 500 by mechanical structures. Securing NFC module 208 in recess 500 using epoxy, overmolding, or mechanical structures can help ensure destruction of NFC module 208 if NFC module 208 is removed from recess 500. This can be helpful in circumstances in which the identifier of band 108 is used to authenticate the band or authorize one or more features associated with the band. However, in other implementations, a PSA may be used to secure NFC module 208 in recess 500 so that NFC module 208 can be removed, repaired, replaced, and/or shared with other bands.

As illustrated in the example of FIG. 16, near-field communications module 208 includes a band module housing 1602 having an outer surface 1607 that forms a portion of a surface 1609 of the attachment portion 206 of the removable band 108 when NFC module 208 is assembled into recess 500 (e.g., as also illustrated in the examples of FIGS. 2, 3, 5, and 7). In the examples of FIGS. 14 and 16, near-field communications module 208 includes a coil antenna such as coil antenna 720 and a memory chip such as memory 706 or memory 1621 disposed within the band module housing.

In the example of FIG. 16, antenna assembly 1604 includes a substrate 1616 having a first surface 1617 on which antenna 720 is mounted. In the example, antenna 720 is wound around a core structure 1612 (e.g., a plastic support structure or a ferrite support structure for enhancement of the performance of antenna 720) that is also mounted on surface 1617. Additional circuitry such as a capacitor 1614 can also be mounted to surface 1617 of substrate 1616. In the example of FIG. 16, memory 1621 (e.g., memory storing a unique identifier for NFC module 208 and thus band 108) is mounted to an opposing side of substrate 1616.

Figure 17:
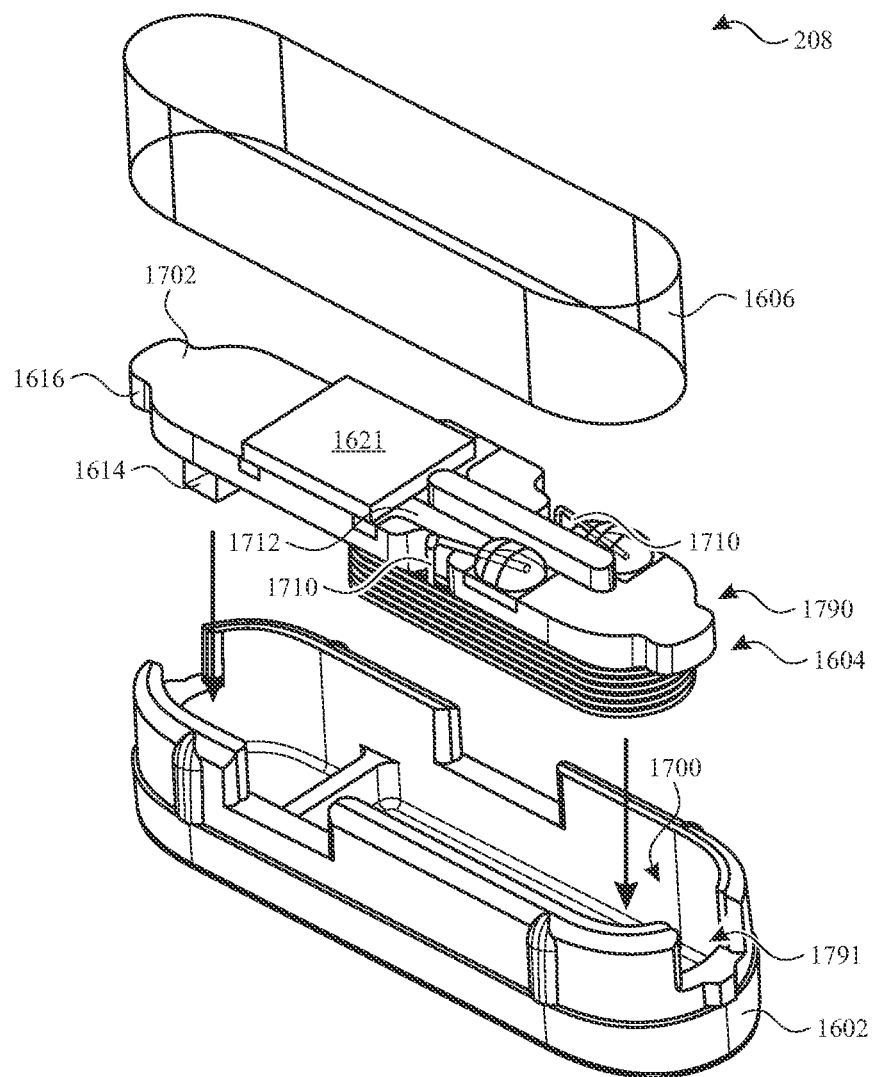
FIG. 17 illustrates a partially exploded bottom perspective view of the near-field communications module of FIG. 16, in accordance with aspects of the disclosure.

Glue 1606 may be arranged to surround antenna assembly 1604 and fill a space between antenna assembly 1604 and band module housing 1602. For example, FIG. 17 illustrates a partially exploded bottom view of NFC module 208 of FIG. 16, in which a cavity 1700 within band module housing 1602 can be seen. Antenna assembly 1604 can be secured within cavity 1700 by glue 1606 filling the cavity 1700 around antenna assembly 1604. FIG. 17 also shows how the substrate 1616 can include alignment features 1790 that engage with corresponding alignment features 1791 on the band module housing 1602 to align and position the antenna assembly 1604 within the cavity 1700. Alignment features 1791 include a recess in an edge of the band module housing 1602 in the example of FIG. 17, but can include other features (e.g., recesses, protrusions, or the like formed on one or more interior surfaces of the cavity 1700) in various implementations.

As shown in FIG. 17, memory 1621 (e.g., an NFC tag chip) is mounted to opposing surface 1702 of substrate 1616. Antenna assembly 1604 may also include conductive structures 1712 that extend between memory 1621 and leads 1710 for antenna 720. As shown, leads 1710 may extend around an edge of substrate 1616 to contact conductive structures 1712.

As illustrated in the example of FIGS. 16 and 17, a band such as band 108 for a wearable electronic device such as wearable electronic device 100 can include an attachment portion 206 configured to be received in a recess 204 in a device housing 104 of the wearable electronic device to removeably attach the band to the device housing, and can include a bumper in the attachment portion 206 to facilitate insertion of the attachment portion 206 of the band 108 into the recess 204 in the device housing 104, where the bumper includes a band module housing 1602 having an outer surface 1607 that forms a portion of an outer surface 1609 of the attachment portion 206 of the band 108, and the bumper also include near-field communications circuitry (e.g., antenna assembly 1604) disposed in a cavity 1700 in the band module housing 1602, the near-field communications circuitry including unique identifier (e.g., stored in memory chip 1621) for the band. The near-field communications circuitry of the bumper (e.g., an active bumper) can include a substrate 1616, memory 1621 mounted to the substrate (the memory storing the unique identifier for the band) and an antenna 720 configured to be powered by additional near-field communications circuitry (e.g., NFC module 210) in the device housing 104 of the wearable electronic device 100 to transmit the unique identifier to the wearable electronic device. The near-field communications circuitry of the bumper can also include a capacitor 1614 mounted to the substrate 1616, and conductive structures 1712 (e.g., overmolded in the substrate) that extend between contacts for the capacitor 1614, the memory 1621, and the antenna 720.

Figure 18:
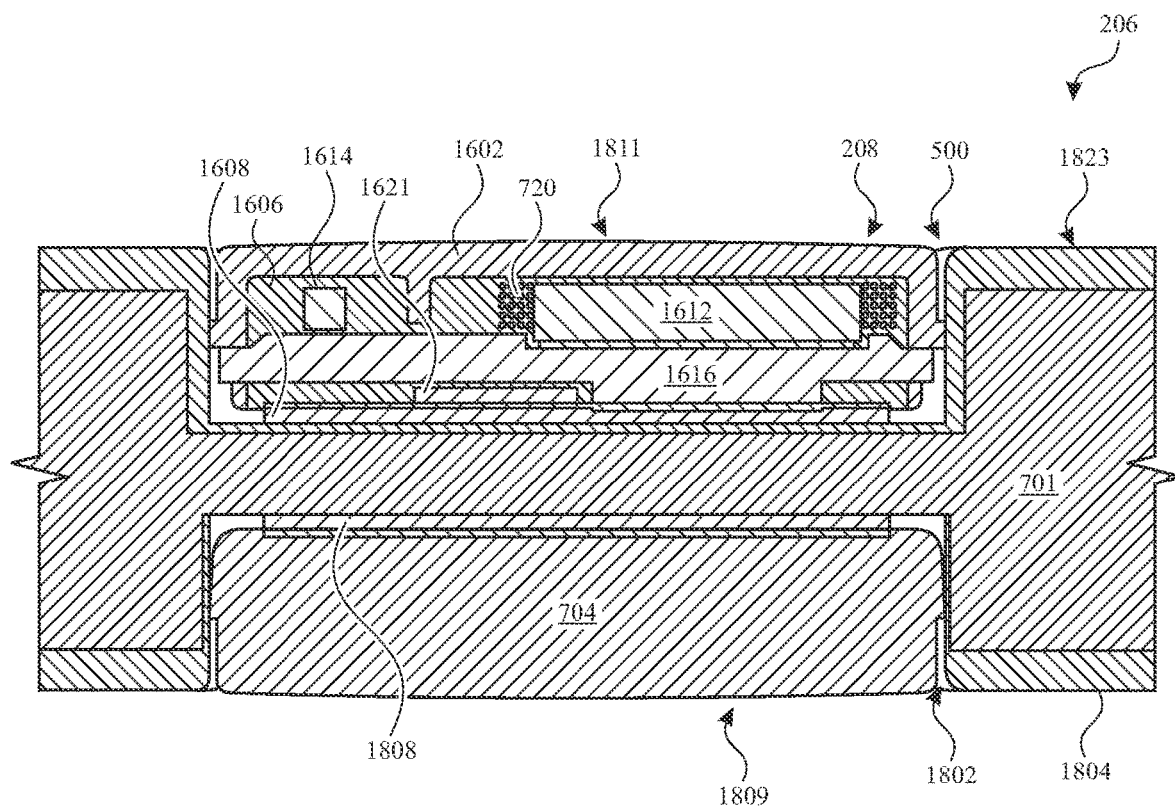
FIG. 18 illustrates a cross-sectional view of a band for a wearable electronic device with the near-field communications component of FIG. 16, in accordance with aspects of the disclosure.

FIG. 18 illustrates a cross-sectional view of part of attachment portion 206 of band 108 with the NFC module 208 of FIGS. 16 and 17 installed therein. As shown in FIG. 18, an outer surface 1811 of band module housing 1602 may form portion of the surface of attachment portion 206. Adhesive 1608 is disposed between substrate 1616 and a bottom surface of the recess 500 in band 108 to secure NFC module 208 therein. Glue 1606 can also be seen surrounding the components of antenna assembly 1604 and filling the space between antenna assembly 1604 and band module housing 1602.

In the cross-sectional view of FIG. 18, bumper 704 on the opposing side of band 108 can be seen attached within a recess 1802 in attachment portion 206 by an adhesive 1808. In this configuration, outer surface 1811 of band module housing 1602 and outer surface 1809 of bumper 704 form opposing portions of the outer surface of attachment portion 206 that facilitate installation and removal (e.g., by facilitating sliding within recess 204 with a desirable amount of sliding resistance) of band 108 to and from recess 204.

As illustrated in, for example,

FIG. 18 (and/or FIGS. 2, 3, 7, and/or 16) NFC module 208 may form an active bumper for a removable band 108, in which the band module housing 1602 is configured to bear against surface 400 of recess 204 when the attachment portion 206 is within the recess 204. As described herein, band 108 may also include one or more passive bumpers such as bumper 300 or bumper 704 (e.g., on a same side or on an opposing side of band 108 as the side in which NFC module 208 is disposed) at least partially embedded within the attachment portion 206 of the band and configured to bear against surface 400 of recess 204 when the attachment portion 206 is within the recess 204.

The cross-sectional view of FIG. 18 also illustrates how a bumper formed by NFC module 208 (e.g., by band module housing 1602) can be disposed in a first recess 500 in a first side 1823 of the attachment portion 206 of the band 108, and the band 108 can also include a passive bumper 704 disposed in a second recess 1802 on an opposing second side of the attachment portion 206 of the band 108. The passive bumper 704 and the band module housing 1602 may be formed from a common material or from different materials. Forming the passive bumper 704 and the band module housing 1602 from a common material may be beneficial for providing uniform resistance to movement of band 108 within and/or along recess 204.

As described above in connection with, for example, FIGS. 3 and 5, an additional passive bumper 300 may be disposed in an additional recess in the first side of the attachment portion 206 of the band 108, and an engagement member 302 may also be disposed between the bumper formed by NFC module 208 and the additional passive bumper 300 on the first side of the attachment portion 206.

Figure 19:
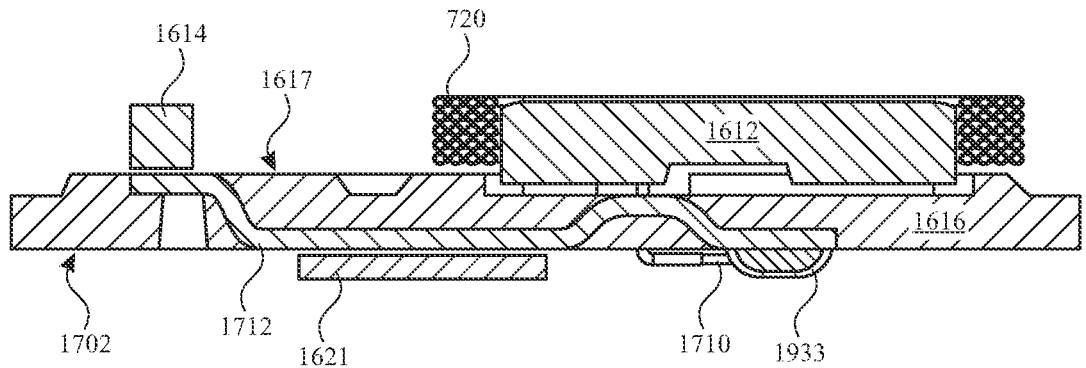
FIG. 19 illustrates a cross-sectional side view of the antenna assembly of FIG. 16, in accordance with aspects of the disclosure.

FIG. 19 illustrates a cross-sectional view of antenna assembly 1604, taken along a line in which the contours of conductive structures 1712 can be seen. As shown in FIG. 19, conductive structures 1712 can extend from capacitor 1614 on surface 1617 of substrate 1616, through substrate 1616 to contact memory 1621 on surface 1702, and beyond memory 1621 to form contact pads for leads 1710 from antenna 720. In the example of FIG. 19, leads 1710 are encapsulated by encapsulant 1933 on surface 1702. Conductive structures 1712 can be formed, for example, from insert molded stamped copper rails. As shown in FIG. 19, antenna 720 may be laterally offset from a center of substrate 1616 to allow for symmetric positioning of NFC module 208 and bumper 300 and for alignment of antenna 720 with antenna 721 of NFC module 210.

Figure 20:
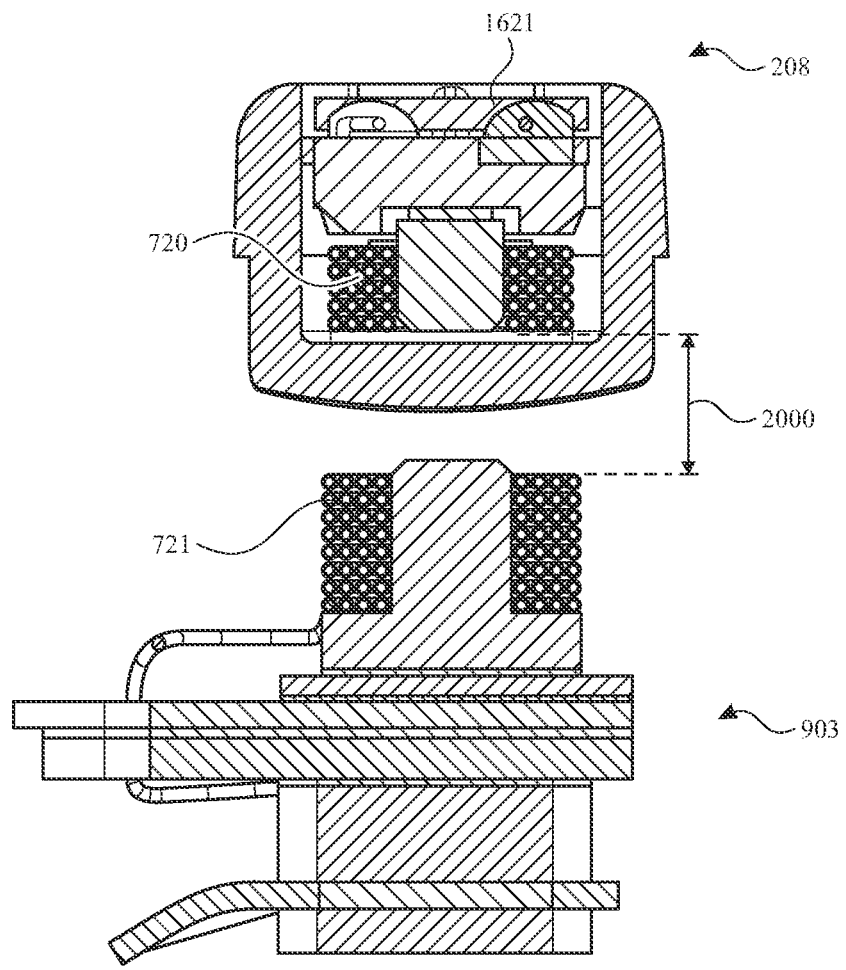
FIG. 20 illustrates a cross-sectional end view of the antenna assembly of FIG. 16 and the antenna assembly of FIGS. 9-13, in accordance with aspects of the disclosure.

FIG. 20 illustrates a cross-sectional view of NFC module 208 of FIGS. 16-19 positioned opposite antenna assembly 903 of NFC module 210 of FIGS. 9-13, as they would be positioned, respectively in band 108 and housing 104, when band 108 is attached within recess 204 of housing 104. In order for antenna 721 of NFC module 210 of main body 101 of device 100 to inductively power antenna 720, and for antenna 720 to transmit the identifier stored in memory 1621 to antenna 721, the attachment portion 206 of the removable band 108 and the recess 204 in the device housing 104 are configured (e.g., in cooperation with the interface portion 404 of NFC module 210 and the band module housing 1602 of NFC module 208) to position antenna 721 of near-field communications module 210 at a predetermined distance 2000 from antenna 720 of the near-field communications module 208. Predetermined distance 2000 may be, for example, less than five millimeters, less than one millimeter, less than 0.75 millimeters, less than 0.6 millimeters, between 0.25 and 0.75 millimeters, or between 0.4 and 0.6 millimeters (as examples). The arrangement of NFC module 208, NFC module 210, band 108, housing 104, and/or recess 204 as described herein allow antenna 720 and antenna 721 to be positioned for powering and communication as described, while maintaining water resistance for the internal cavity of housing 104, and providing the mechanical and aesthetic benefit of symmetric bumper functionality for the NFC module 208.

As illustrated in the example of FIG. 20, the cross-sectional width (e.g., and/or the cross-sectional length) of antenna 720 may be smaller than the corresponding cross-sectional width (e.g., and/or the cross-sectional length) of antenna 721 in some implementations. Thus, in an attached configuration for band 108, while antenna 720 and antenna 721 may be axially aligned, antenna 720 and antenna 721 may have different footprints when viewed the axes of the antennas.

Figure 21:
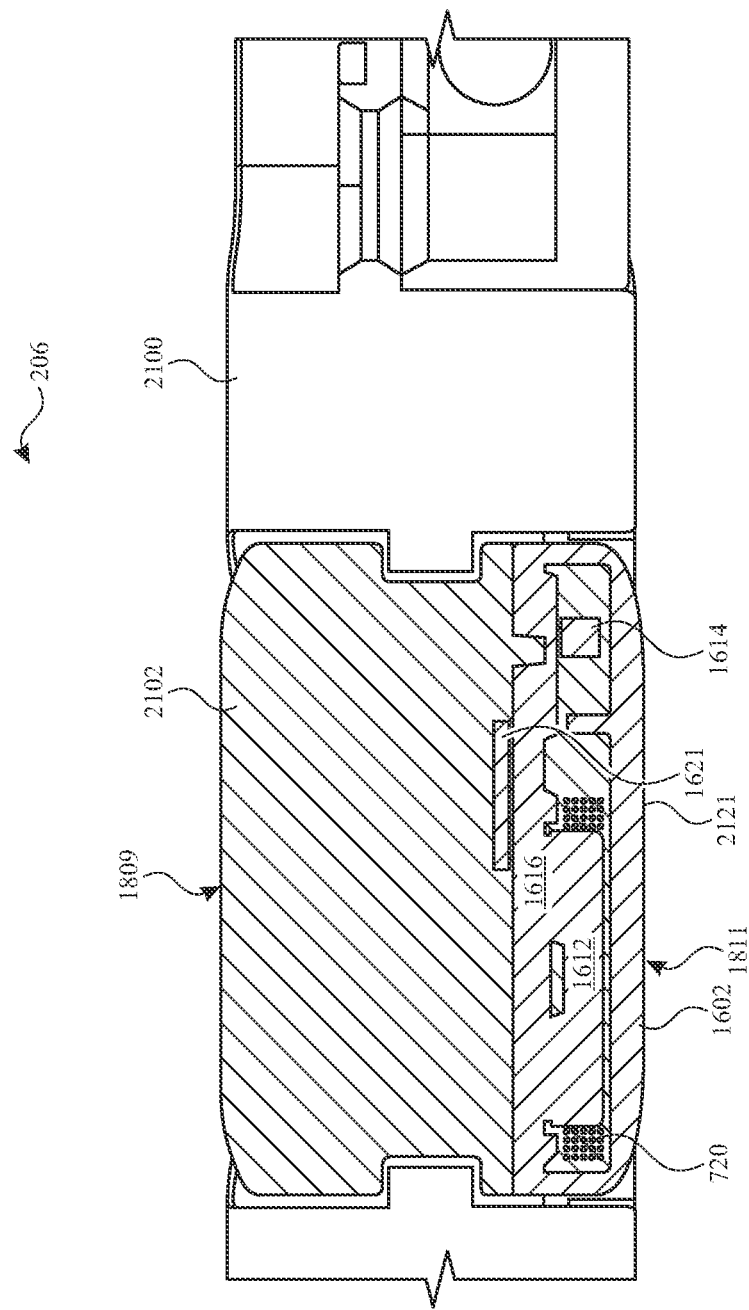
FIG. 21 illustrates a cross-sectional view of a near-field communications module disposed in a rigid band material, in accordance with aspects of the disclosure.

As described herein, in various implementations, band module housing 1602 can be formed from a rigid material such as a glass-fiber reinforced polyamide to provide a smooth hard outer surface 1811 for providing bumper functionality for NFC module 208. However, as also noted herein, in some implementations, attachment portion 206 can be formed from a rigid material such as a metal. FIG. 21 illustrates a cross-sectional view of attachment portion 206 of a band 108 that is formed from a rigid material 2100 (e.g., a metal such as stainless steel). In the example of FIG. 21, band module housing 1602 is embedded within a relatively softer material 2102 (e.g., a flouroelastomer or other resiliently compressible material). In this example, a layer 2121 of material 2102 is formed over the outer surface of band module housing 1602 so that both of opposing outer surfaces 1809 and 1811 form relatively soft bumper surfaces for attachment portion 206. In this example material 2102 can be resiliently compressible so that, when attachment portion is pressed into recess 204, material 2102 compresses to allow insertion of band 108 into the recess 204 while resiliently providing an outward force between surfaces 1809 and 1811 and the surface 400 of recess 204 to facilitate sliding of band 108 into recess 204 with a desirable amount of frictional resistance.

In the example of FIG. 21, an NFC module 208 having a band module housing 1602 and an antenna assembly 1604 disposed within a cavity in the band module housing is embedded in the material 2102. However, in some implementation, an embedded NFC module may be provided in an elastomeric material without the band module housing.

Figure 22:
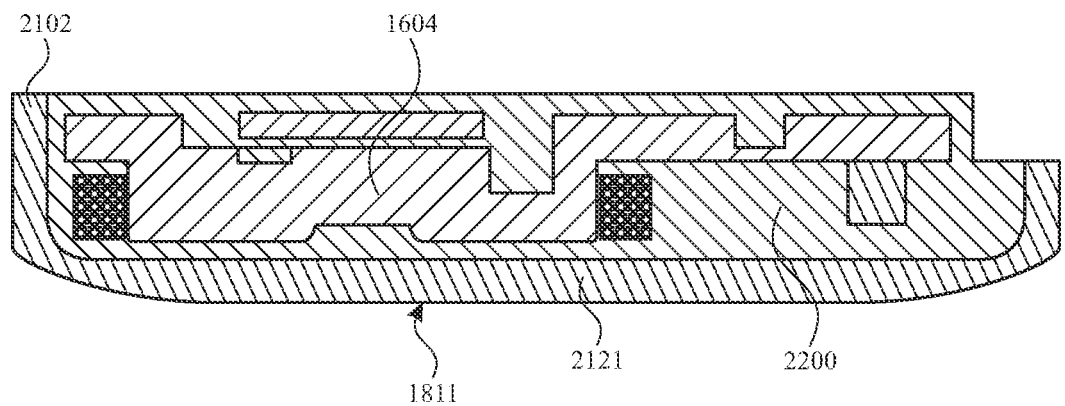
FIG. 22 illustrates a cross-sectional view of a near-field communications module disposed in a flexible band material, in accordance with aspects of the disclosure.

For example, FIG. 22 illustrates an implementation in which the antenna assembly 1604 is coated with a first material 2200, such as a resin or a polymer (e.g., a thermosetting polymer such as epoxy), after which the antenna assembly 1604 coated with the first material 2200 can be embedded (e.g., overmolded) in the material 2102. In the example of FIG. 22, the layer 2121 of material 2102 is formed over an outer surface of first material 2200 so that both of opposing outer surfaces 1809 and 1811 (see, e.g., FIG. 21) form relatively soft bumper surfaces for attachment portion 206.

Various examples of implementations of NFC modules 208 and NFC modules 210 are described herein in connection with, for example, FIGS. 7-21. However, it should be appreciated that other implementations of NFC module 208 and other implementations of NFC module 210 are contemplated herein.

Figure 23:
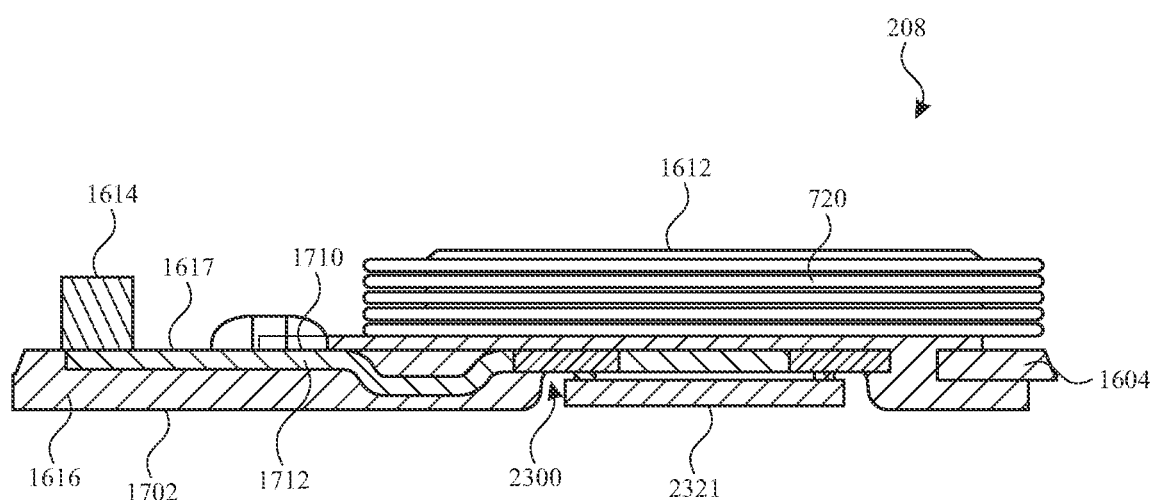
FIG. 23 illustrates a side view of an antenna module for a near-field communications module for a band, in accordance with aspects of the disclosure.

For example, FIG. 23 illustrates an implementation of NFC module 208 with a reduced size in multiple dimensions, and for which simplified manufacturing can be applied. In the example of FIG. 23, antenna assembly 1604 includes a substrate 1616 having a first surface 1617 on which antenna 720 is mounted. In the example, antenna 720 is wound around a core structure 1612 (e.g., a plastic support structure or a ferrite support structure for enhancement of the performance of antenna 720) that is also mounted on surface 1617. Additional circuitry such as a capacitor 1614 can also be mounted to surface 1617 of substrate 1616. In the example of FIG. 23, leads 1710 of the coil of antenna 720 contact conductive structures 1712 on the same side of antenna assembly 1604 as surface 1617 of substrate 1616 (e.g., without extending around an edge of the substrate 1616). Forming the contacts between leads 1710 and conductive structures 1712 on the same side of antenna assembly 1604 as surface 1617 of substrate 1616 as in FIG. 23 can reduce the complexity of the manufacturing process for antenna assembly 1604 and/or facilitate a simplified manufacturing process for antenna assembly 1604 (e.g., by allowing the wire for the antenna 720 to be wound around the core structure 1612 and leads 1710 to be coupled to conductive structures 1712 in an automated process).

In the example of FIG. 23, circuitry 2321 is mounted in a recess 2300 in the substrate 1616 (e.g., a recess in the opposing side of substrate 1616 from the side on which antenna 720 and capacitor 1614 are mounted). Circuitry 2321 may be, for example, an implementation of memory 1621 described herein, or may be an integrated circuit that includes memory (e.g., storing a unique identifier for NFC module 208 and thus band 108) and/or additional processing circuitry. Circuitry 2321 may be configured to processes NFC communications from NFC module 210 and received by antenna 720, to manage communications to NFC module 210 using antenna 720, and/or to manage RF power received from NFC module 210 at antenna 720. Mounting the memory 1621 in the recess 2300 as in the example of FIG. 23 can reduce the z-height of the antenna assembly 1604, which can be helpful for implementations of the NFC module in bands 108 that are formed from certain band materials (e.g., braided bands that have rigid attachment portions 206 and soft bumpers).

Figure 24:
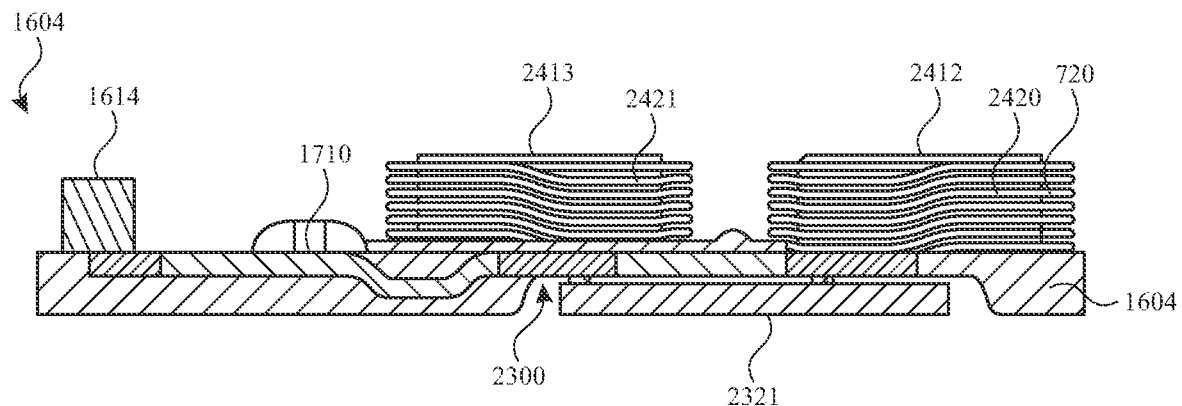
FIG. 24 illustrates a side view of a multi-coil antenna module for a near-field communications module for a band, in accordance with aspects of the disclosure.

As another example, FIG. 24 illustrates an implementation of an antenna assembly 1604 of NFC module 208 in which circuitry 2321 is mounted in the recess 2300 in substrate 1616, and antenna 720 is provided in a multi-coil arrangement. As shown in the example of FIG. 24, in one or more implementations, the antenna assembly 1604 may include an antenna 720 that includes two coils 2420 and 2421 (e.g., a pair of coils) that are each wound around a respective core structure 2412 and 2413 (e.g., a pair of corresponding core structures or support structures) that are mounted on, or formed as protrusions from, surface 1617. Core structure 2412 for coil 2420 may be a plastic or other insulating support structure or a ferrite support structure for enhancement of the performance of antenna 720 in various implementations. Core structure 2413 for coil 2421 may be a plastic or other insulating support structure or a ferrite support structure for enhancement of the performance of antenna 720 in various implementations.

Figure 25:
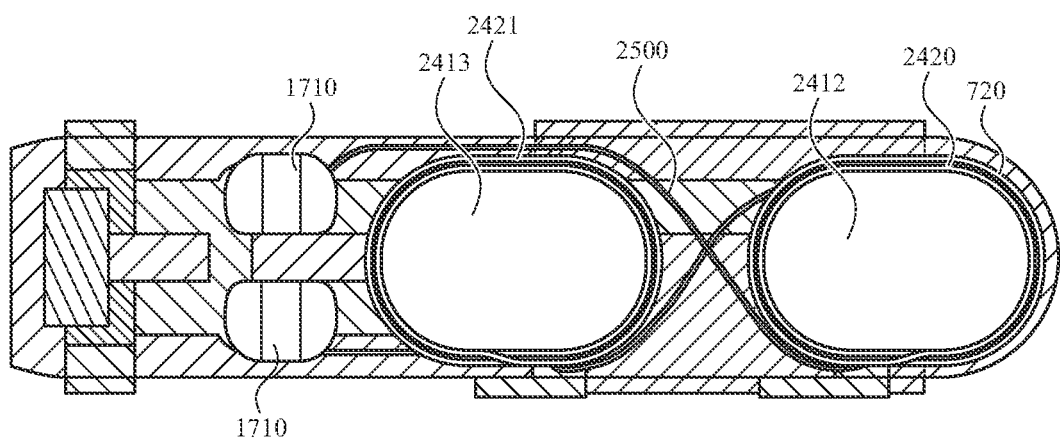
FIG. 25 illustrates a top view of the multi-coil antenna module of FIG. 24, in accordance with aspects of the disclosure.

FIG. 25 illustrates a top view of the antenna assembly 1604 of FIG. 24, in which the two coils 2420 and 2421 and their respective core structures 2412 and 2413, and leads 1710 can be seen. In the top view of FIG. 25, portions 2500 of the single wire forming both coils of antenna 720 are visible extending between the two coils 2420 and 2421. In one or more implementations, an NFC module 208 having a multi-coil antenna module, as in the example of FIGS. 24 and 25, can communicate with a (e.g., mirrored) multi-coil antenna module in housing 104 to form one or more magnetic flux loops through the multi-coil antennas that can facilitate providing, exchanging, and/or receiving identification, power, and/or other communications between the processing circuitry of the wearable device 100 and the band 108.

Figure 26:
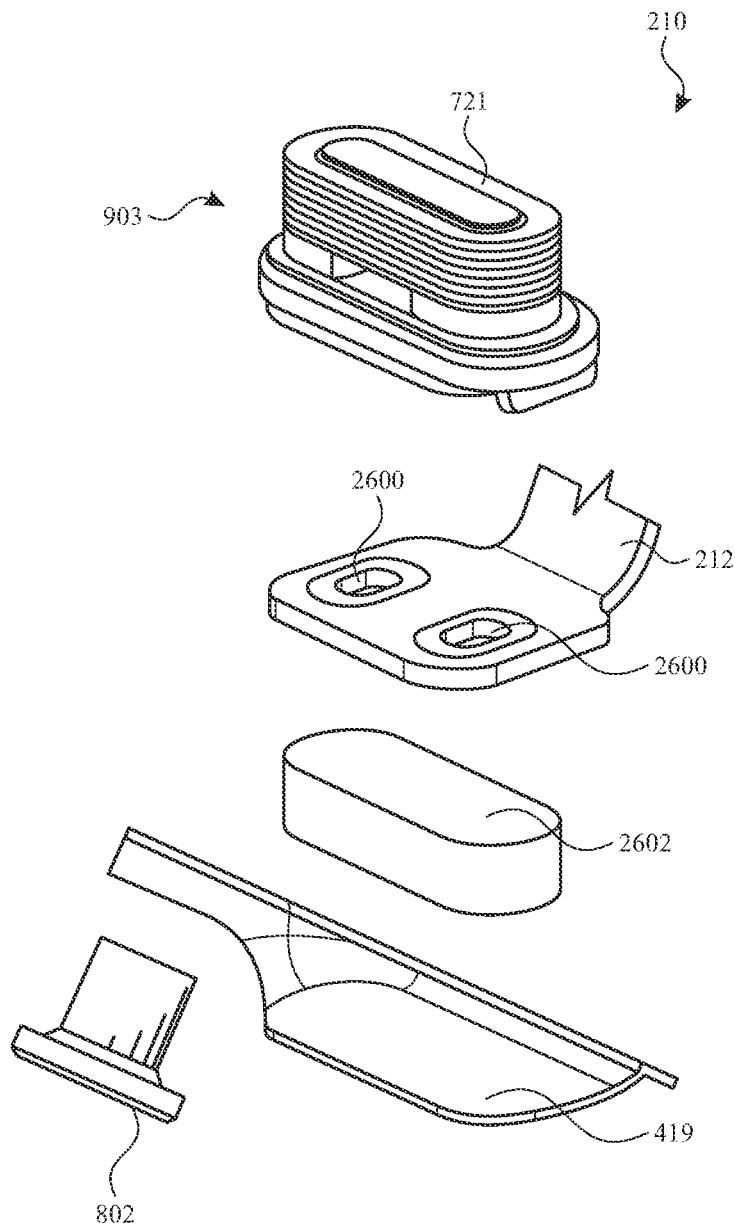
FIG. 26 illustrates a partially exploded perspective view of another near-field communications component for a housing of a wearable electronic device, in accordance with aspects of the disclosure.

FIG. 26 illustrates a partially exploded perspective view of structures for mounting another implementation of NFC module 210 in the housing 104. As shown in FIG. 26, NFC module 210 may be mounted a flexible printed circuit 212 that is implemented with connection features such as Plated Through-Hole (PTH) features 2600 for coupling the flexible printed circuit 212 to conductive contacts on the NFC module 210 (e.g., and thus to the leads for antenna 721). In this example, flexible printed circuit 212 may be attached by a foam and/or adhesive structure 2602 to cowling 419, which can be attached to an interior surface of housing 104 such as by screw 802 as described herein.

Figure 27:
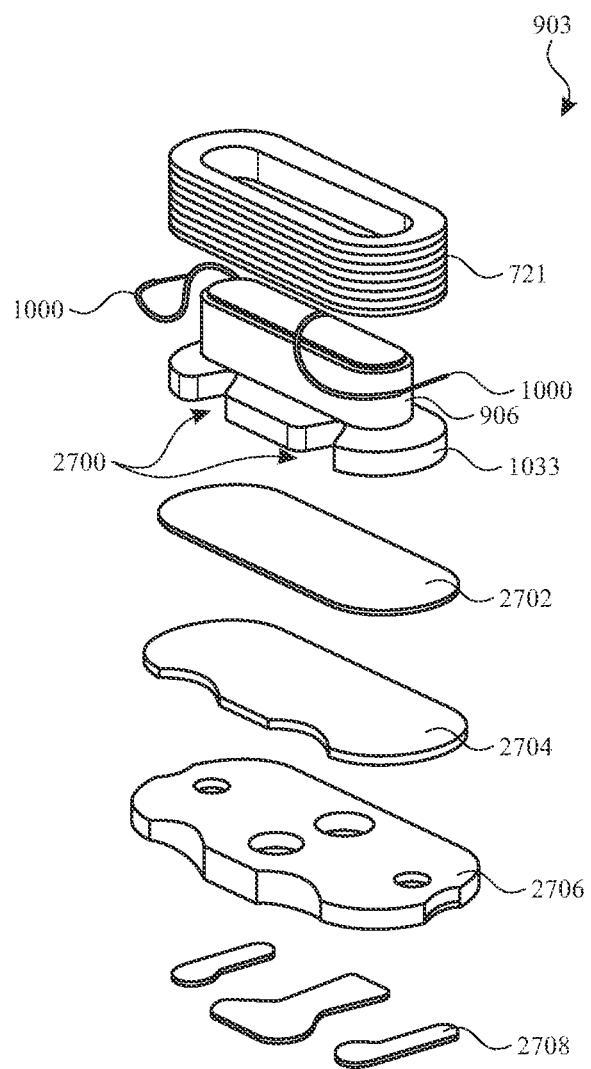
FIG. 27 illustrates an exploded perspective view of the near-field communications component of FIG. 26, in accordance with aspects of the disclosure.

FIG. 27 illustrates an exploded perspective view of the antenna assembly 903 of FIG. 26. In the example of FIG. 27, antenna assembly 903 includes antenna 721 implemented as a wound coil that is wound around a core structure 906. Core structure 906 may be a plastic structure that is provided primarily for support of antenna 721, or may be a magnetic (e.g., ferrite) core that supports antenna 721 and enhances the efficiency of antenna 721.

In the example of FIG. 27, antenna assembly 903 includes an adhesive layer 2702 for attaching core structure 906 to a magnetic layer 2704 such as a ferrite sheet. The magnetic layer 2704 may be attached to an interposer 2706, and a patterned adhesive layer 2708 may be provided on an opposing side of the interposer 2706 (e.g., to attach the antenna assembly 903 to the flexible printed circuit 212).

FIG. 27 also shows how core structure 906 may have a base portion 1033 that includes cutouts 2700 that allow leads 1000 from antenna 721 to extend past the base portion of the core structure and around an edge of interposer 2706 to terminate on a side of interposer 2706 that is opposite to the side on which antenna 721 is mounted (e.g., mounted via magnetic layer 2704 and adhesive layer 2702, and support structure 906).

Figure 28:
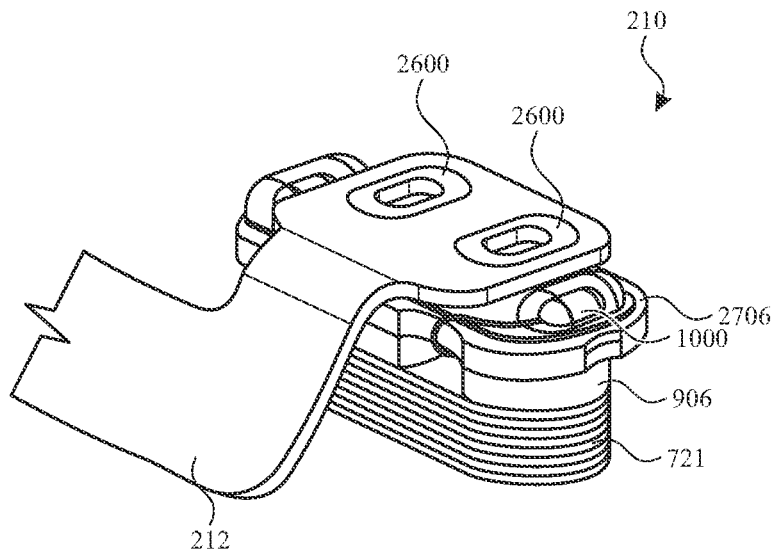
FIG. 28 illustrates an assembled bottom perspective view of the antenna module of the near-field communications component of FIG. 26, in accordance with aspects of the disclosure.

FIG. 28 illustrates a bottom perspective view of antenna assembly 903 of FIG. 27 in an assembled configuration and attached to flexible printed circuit 212. FIG. 28 shows how leads 1000 can terminate on a bottom surface of interposer 2706 and interposer 2706 can be communicatively coupled to flexible printed circuit 212 using PTH features 2600 (or other electrical connecting structures or materials).

Figure 29:
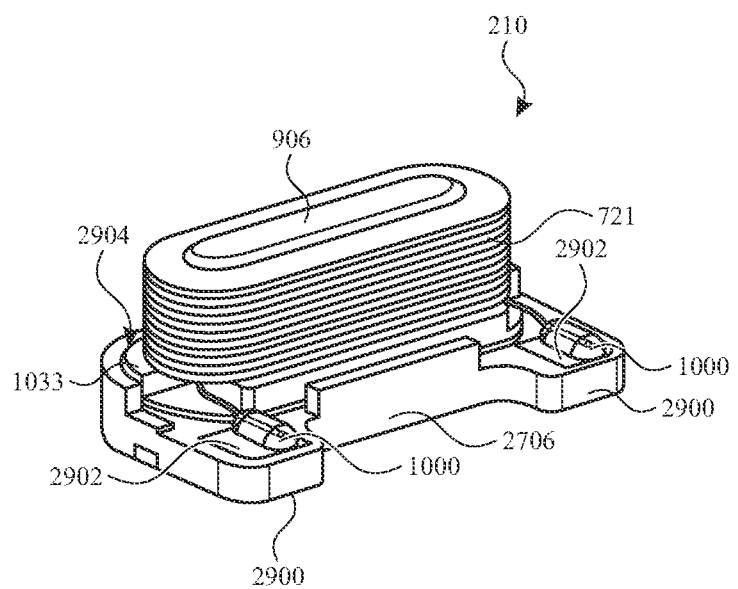
FIG. 29 illustrates an assembled top perspective view of another near-field communications component for a housing of a wearable electronic device, in accordance with aspects of the disclosure.

FIG. 29 illustrates a top perspective view of antenna assembly 903 in other implementation. In the example of FIG. 29, interposer 2706 includes extensions 2900 on which contact pads 2902 are formed. In this example, leads 1000 of the antenna 721 are conductively coupled to contact pads 2902 on the same side of interposer 2706 on which support structure 906 is mounted. In this example, base portion 1033 is partially disposed in a recess 2904 in the surface of the interposer 2706 on which the contact pads 2902 are formed.

Figure 30:
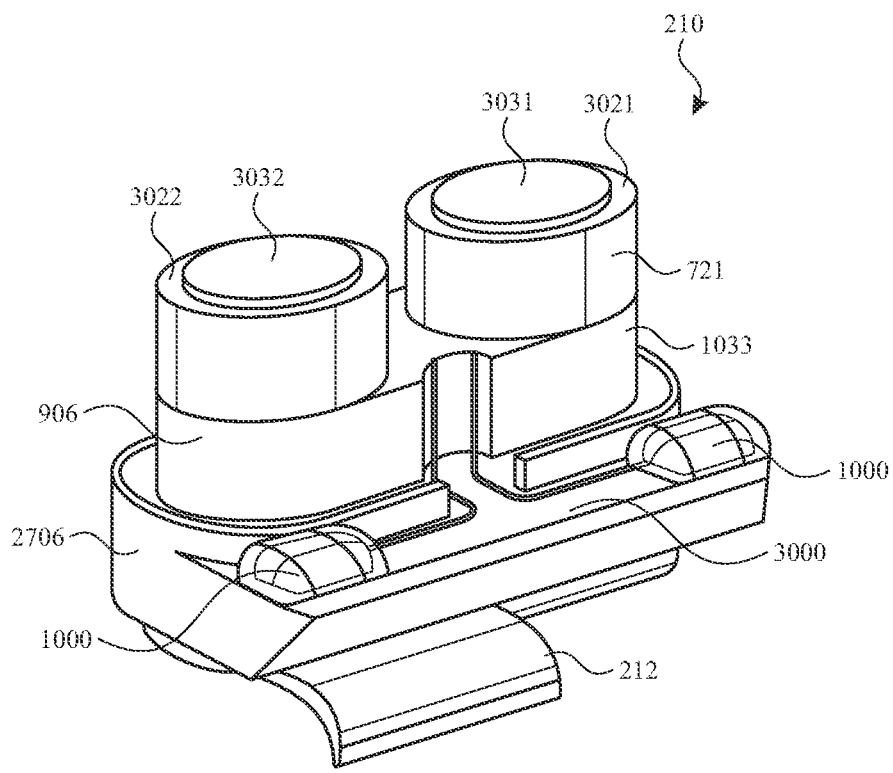
FIG. 30 illustrates an assembled top perspective view of a multi-coil near-field communications component for a housing of a wearable electronic device, in accordance with aspects of the disclosure.

FIG. 30 illustrates another implementation of NFC module 210, in which the antenna assembly 903 is provided in a multi-coil arrangement. For example, the multi-coil arrangement of NFC module 210 may be disposed in housing 104 to form a mirrored pair of coils with the coils 2420 and 2421 of the multi-coil arrangement of NFC module 208 shown in FIGS. 24 and In the example of FIG. 30, antenna 721 of NFC module 210 includes multiple coils (e.g., two coils 3021 and 3022 formed from two windings of a single wire) wound around multiple respective core structures (e.g., two parallel support structures such as core structures 3031 and 3032). In this example, core structures 3031 and 3032 are portions of the core structure 906 that extend (e.g., vertically and in parallel) from the base portion 1033 of the core structure 906. Core structure 906, including base portion 1033 and the respective core structures 3031 and 3032 for the coils 3021 and 3022, may be a plastic structure that is provided primarily for support of antenna 721, or may be a magnetic (e.g., ferrite) core that supports antenna 721 and enhances the efficiency of antenna 721.

In the example of FIG. 30, base portion 1033 of core structure 906 is partially disposed in a recess in an interposer 2706. In this example, interposer 2706 also includes a ledge 3000 on which leads 1000 from antenna 720 are conductively coupled to conductive pads. In this configuration, conductive structures of the interposer 2706 (not explicitly visible in FIG. 30) couple the pads on ledge 3000 (to which the leads 1000 are coupled) to the flexible printed circuit 212. In configurations in which the multi-coil arrangement of NFC module 210 is mounted in housing 104, the multi-coil arrangement of NFC module 208 is mounted in band 108, and band 108 is mounted in the recess 204 in the housing 104, coils 2420 and 2421 of NFC module 208 and coils 3021 and 3022 of NFC module 210 may form mirrored pairs of coils that can be used to communicate power, identifiers, and/or other information and/or signals between the band 108 and the processing circuitry of the wearable electronic device 100.

Various examples are described herein (e.g., in connection with FIGS. 7, 9, 12, and 13) in which adhesive 722 that extends around the periphery of interface portion 404 attaches the interface portion 404 within the opening 407 in recess 204 of housing 104. However, it should be appreciated that other implementations of interface portion 404, and the attachment between the interface portion 404 and the housing 104, are contemplated.

Figure 31:
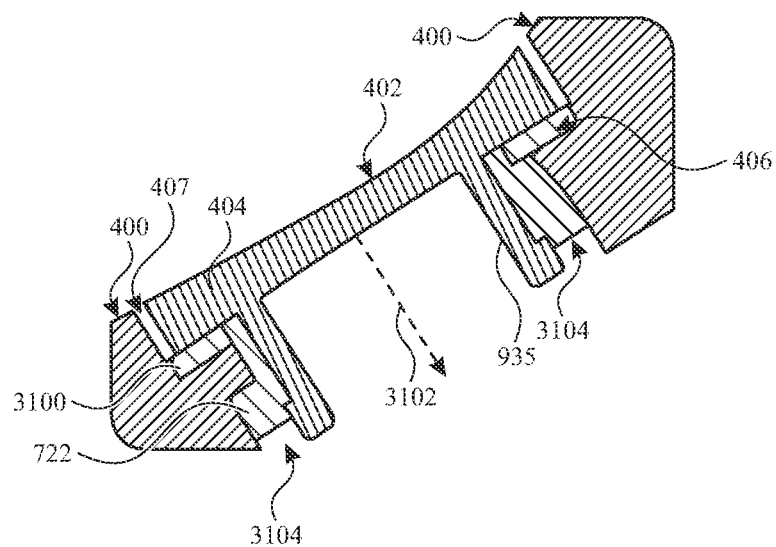
FIG. 31 illustrates a cross-sectional view of a cap for a near-field communications component installed in a housing of a wearable electronic device, in accordance with aspects of the disclosure.

For example, FIG. 31 illustrates an implementation in which an adhesive film 3100 (e.g., a heat activated film (HAF)) is disposed between the ledge 406 in opening 407 and the interface portion 404. In the example of FIG. 31, the interface portion 404 may be inserted into the opening 407 in the direction 3102, and the adhesive film 3100 can be cured (e.g., by application of heat). Once the interface portion 404 is bonded to the ledge 406 by adhesive film 3100, adhesive 722 may be dispensed into a gap 3104 between the extended portion 935 of the interface portion 404 and the opening 407 to attach the interface portion 404 within the opening 407. In this example, the adhesive film 3100 can provide a barrier or glue dam, during dispensing of adhesive 722, that prevents the adhesive 722 from passing into the recess 204.

Figure 32:
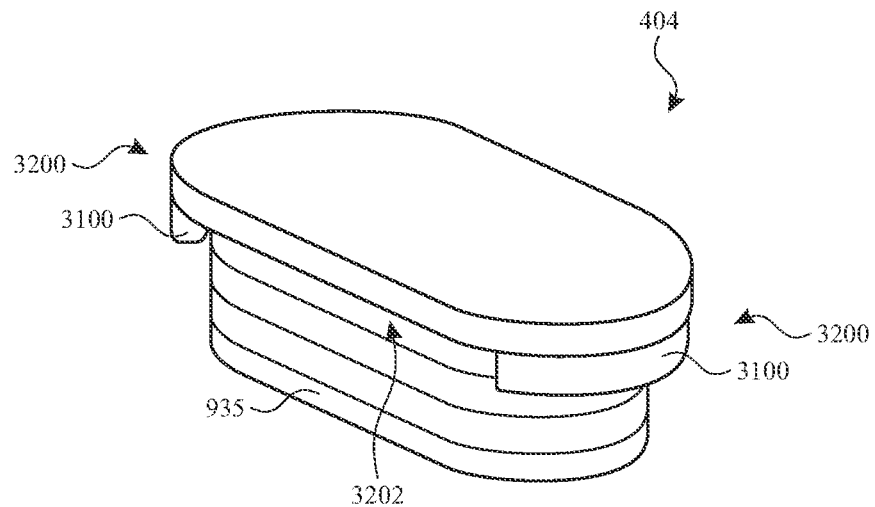
FIG. 32 illustrates a perspective top view of a cap for a near-field communications component for installation in a housing of a wearable electronic device, in accordance with aspects of the disclosure.
Figure 33:
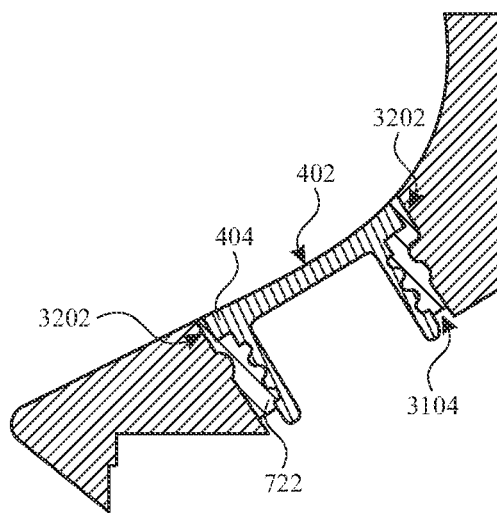
FIG. 33 illustrates a cross-sectional view of the cap of FIG. 32 installed in a housing of a wearable electronic device, in accordance with aspects of the disclosure.

In the example of FIG. 31, the adhesive film 3100 can extend around the entire periphery of the interface portion, or can be disposed along one or more (e.g., discontinuous) portions of the periphery. For example, FIG. 32 illustrates a top perspective view of interface portion 404 in which adhesive film 3100 is formed on two end portions 3200 of the periphery of the interface portion 404, with a gap 3202 in the adhesive film 3100 along one or more of the edges of the periphery of the interface portion 404. As shown in FIG. 33, in the implementation of FIG. 32, along the edges of the periphery of the interface portion 404, the gap 3202 can be filled with adhesive 722 that is dispensed into the gap 3104. In this way (e.g., by providing a gap 3202 in the adhesive film 3100), the width of the interface portion 404 (e.g., along the direction A-A of FIG. 6) can be reduced, which can facilitate sliding of the band 108 into and out of the recess 204 in some implementations.

Figure 34:
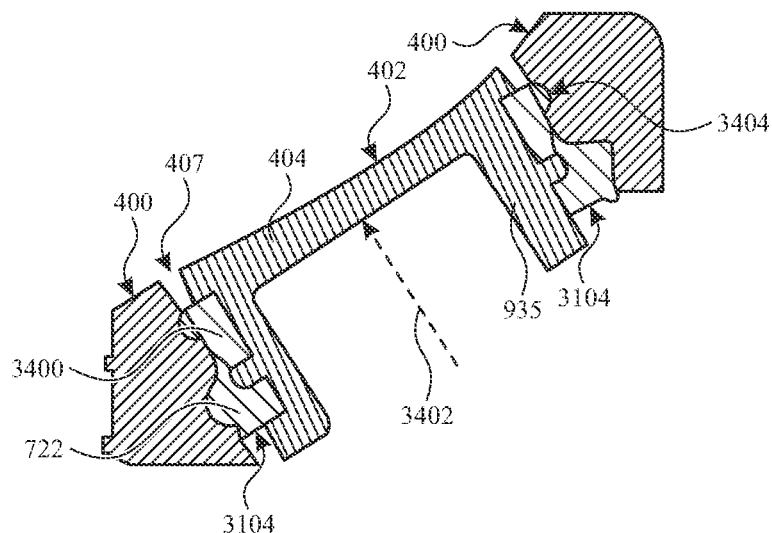
FIG. 34 illustrates a cross-sectional view of another cap for a near-field communications component installed in a housing of a wearable electronic device, in accordance with aspects of the disclosure.
Figure 35:
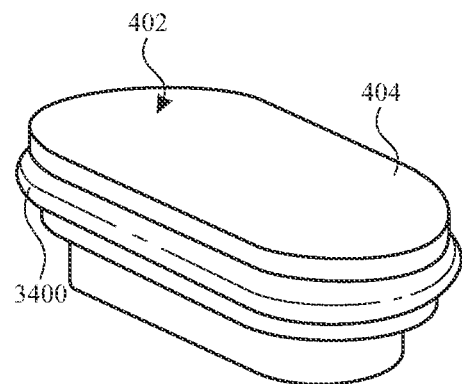
FIG. 35 illustrates a perspective top view of the cap of FIG. 34, in accordance with aspects of the disclosure.

FIG. 34 illustrates another implementation of interface portion 404. In the example of FIG. 34, the interface portion 404 includes a gasket 3400 (e.g., an overmolded silicon gasket). In this example, the interface portion 404 (including the gasket 3400) may be inserted into the opening 407 from within the housing (e.g., in the direction 3402), and gasket 3400 may act as a barrier to adhesive 722 when adhesive 722 is then dispensed into the gap 3104. In the example of FIG. 34, opening 407 is provided without a ledge 406, and interface portion 404 is provided without an overhanging portion that rests on the ledge. In this way, the width of the opening 407 in the recess 204 may be reduced (e.g., along the direction A-A of FIG. 6), which can facilitate sliding of the band 108 into and out of the recess 204 in some implementations. FIG. 35 illustrates a top perspective view of the gasket 3400 extending around the periphery of the interface portion 404.

Figure 36:
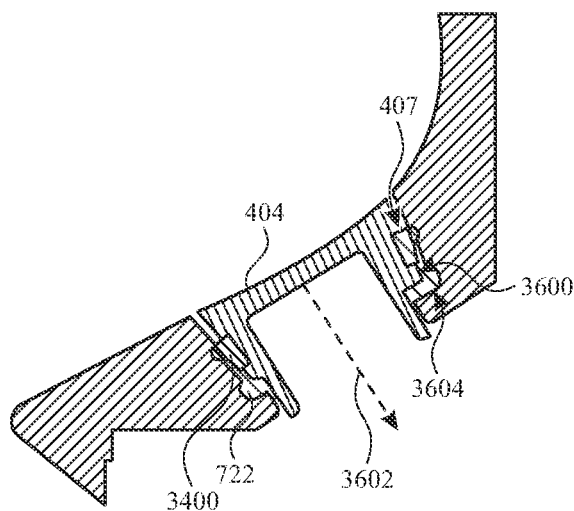
FIG. 36 illustrates a cross-sectional view of another cap for a near-field communications device installed in a housing of a wearable electronic device, in accordance with aspects of the disclosure.

In the configuration of FIG. 34, opening 407 may include features such as features 3404 that can be filled with the dispensed adhesive 722 to provide add strength to withstand a predetermined amount of pressure (e.g., one bar, two bar, three bar, five bar, at least five bar, or more than five bar), such as to provide a desired water resistance for wearable electronic device 100. FIG. 36 illustrates a configuration in which an interface portion 404 that includes a gasket 3400 can be inserted (e.g., in a direction 3602 from the recess 204) into an opening 407 that tapers in the direction 3602, so that (in an assembled configuration) pressure from the band and/or fluid in the recess 204 presses the interface portion 404 into compression to help withstand a predetermined amount of pressure (e.g., one bar, two bar, three bar, five bar, at least five bar, or more than five bar), such as to provide a desired water resistance for wearable electronic device 100. In the example of FIG. 34, the interface portion 404 also includes a protrusion 3600 extending from the extended portion 935, that can be attached by adhesive 722 to a ledge 3604 on the tapered opening 407.

In various examples described herein (e.g., in connection with FIGS. 7, 9, 12, 13, and 31-36), interface portion 404 is formed separately from the housing 104 and installed in an opening 407 therein using, for example, adhesive 722 and/or other attachment materials and/or mechanisms. However, it should be appreciated that, in one or more implementations, the interface portion 404 for NFC module 210 may be integrally formed with the housing 104 (e.g., to provide a seamless, co-finished surface 400 within the recess 204, in which the outer surface of the cap forms a co-finished portion of the surface of the recess in the device housing).

Figure 37:
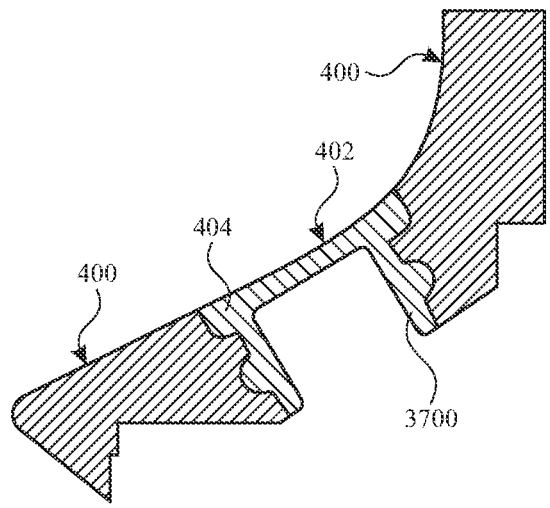
FIG. 37 illustrates a cross-sectional view of a co-finished cap for a near-field communications device integrally formed with a housing of a wearable electronic device, in accordance with aspects of the disclosure.

For example, FIG. 37 illustrates an example in which the interface portion 404 is formed by a cured adhesive material 3700 (e.g., a thermosetting polymer or resin such as an epoxy material). In this example, the interface portion 404 may be integrally formed with the housing 104 by machining a pocket into the housing 104 prior to forming the recess 204, filling the pocket with the adhesive material 3700 and curing the adhesive material 3700, and then machining the recess 204 in the housing material for housing 104 in which the cured adhesive material 3700 is already disposed. In this way, the outer surface 402 of the interface portion 404 and the surface 400 of the recess 204 can be formed in a common machining process. In this example, the extended portion 935 of the interface portion 404 may also be formed by machining a cavity in the cured adhesive for insertion/attachment of the coil of antenna 720 of NFC module 210.

In the example of FIG. 37, the interface portion 404 is entirely formed from the cured and machined adhesive material 3700. However, in other implementations, an interface portion 404 that is integrally formed with the housing 104 (e.g., to provide a seamless, co-finished surface 400 within the recess 204, as illustrated in FIG. 37) may be formed using other materials and/or processes. For example, instead of curing and machining the adhesive material 3700, the interface portion 404 may be integrally formed with the housing 104 by machining a pocket into the housing 104 prior to forming the recess 204, and forming the interface portion in the pocket using a direct injection molding process. For example, a thermoplastic or thermosetting polymer material may be direct injection molded into the machined pocket, and then the recess 204 may be machined in the housing material for housing 104 in which the injection molded material is already disposed. In this way, the outer surface 402 of the interface portion 404 formed by direct injection molding, and the surface 400 of the recess 204, can be formed in a common machining process. In this example, the extended portion 935 of the interface portion 404 may be formed using an appropriately shaped mold structure during the injection molding process, or can also be formed by machining a cavity in the injection molded material for insertion/attachment of the coil of antenna 720 of NFC module 210.

Figure 38:
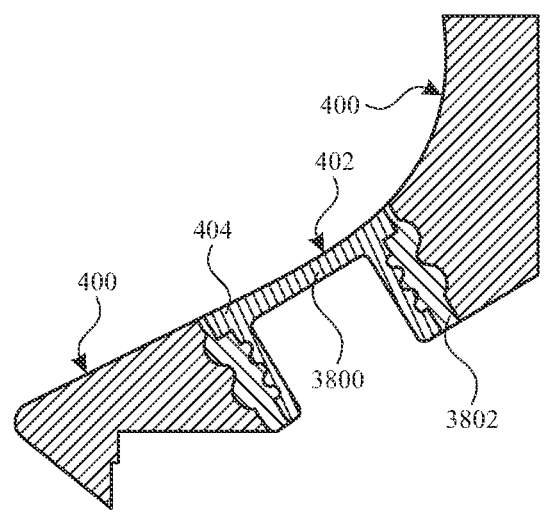
FIG. 38 illustrates a cross-sectional view of another co-finished cap for a near-field communications device integrally formed with a housing of a wearable electronic device, in accordance with aspects of the disclosure.

In yet other implementations, an interface portion 404 that is integrally formed with the housing 104 (e.g., to provide a seamless, co-finished surface 400 within the recess 204) may be formed from more than one material. For example, FIG. 38 illustrates an example in which the interface portion 404 is formed by a first material 3800 (e.g., a plastic material or other polymer) and a cured adhesive material 3802 (e.g., a thermosetting polymer or resin such as an epoxy material). In this example the interface portion 404 may be integrally formed with the housing 104 by machining a pocket into the housing 104 prior to forming the recess 204, attaching a plug formed from the first material 3800 in the machined pocket with the adhesive material 3802 (and curing the adhesive material), and then machining the recess 204 in the housing material for housing 104 in which the plug and the cured adhesive material 3802 is already disposed. In this way, the outer surface 402 of the interface portion 404 (e.g., substantially formed by the first material 3800) and the surface 400 of the recess 204 can be formed in a common machining process. In this example, the extended portion 935 of the interface portion 404 may also formed by machining a cavity in the plug formed by the first material 3800, for insertion/attachment of the coil of antenna 720 of NFC module 210.

In accordance with aspects of the disclosure, a wearable device system is provided that includes a main body. The main body includes a device housing, processing circuitry disposed within the device housing, a recess on an edge of the device housing, and a first near-field communications module mounted within the device housing adjacent to the recess. The wearable device system also includes a band configured to secure the main body to a wearer, the band including an attachment portion configured to be received in the recess in the device housing to removeably attach the band to the main body, and a second near-field communications module at least partially embedded within the attachment portion and including an identifier for the band. In an attached configuration for the band, the attachment portion of the band and the recess in the device housing are configured to align the first near-field communications module with the second near-field communications module.

In accordance with other aspects of the disclosure, a band for a wearable electronic device is provided that includes an attachment portion configured to be received in a recess in a device housing of the wearable electronic device to removeably attach the band to the device housing, and a bumper in the attachment portion to facilitate insertion of the attachment portion of the band into the recess in the device housing. The bumper includes a band module housing having an outer surface that forms a portion of an outer surface of the attachment portion of the band and near-field communications circuitry disposed in a recess in the band module housing, the near-field communications circuitry comprising a unique identifier for the band.

In accordance with aspects of the disclosure, a wearable electronic device is provided that includes a device housing, processing circuitry disposed within the device housing, a recess on an edge of the device housing, and a near-field communications module mounted within the device housing adjacent to the recess to read a unique identifier of a band having a portion mounted in the recess, the band configured to secure the device housing to a wearer. The near-field communications module includes an antenna module and a cap having an outer surface that forms a portion of a surface of the recess.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A wearable electronic device, comprising:
   a housing that at least partially defines an internal cavity;
   a recess on an edge of the housing; and
   an identifier component that is configured obtain a characteristic of a strap for the wearable electronic device when a portion of the strap is within the recess, wherein the identifier component comprises an interface component that is disposed in an opening in the housing, that comprises an outer surface that forms a portion of a surface of the recess, and that is configured to seal the internal cavity against a predetermined amount of fluid pressure on the outer surface of the interface component.

2. The wearable electronic device of claim 1, wherein the opening in the housing comprises a ledge, wherein a first part of the interface component is attached to the ledge by an adhesive film that forms a dam for an adhesive that attaches a second part of the interface component to the housing within the opening.

3. The wearable electronic device of claim 2, wherein the adhesive film is formed on two opposing end portions of a periphery of the interface component, with a gap in the adhesive film along one or more edges of the periphery of the interface component.

4. The wearable electronic device of claim 3, wherein the adhesive that attaches the second part of the interface component to the housing within the opening includes a portion that fills the gap in the adhesive film.

5. The wearable electronic device of claim 1, wherein the interface component comprises:
   a gasket that extends around a periphery of the interface component; and
   an adhesive that contacts the gasket and attaches a second part of the interface component to the housing within the opening.

6. The wearable electronic device of claim 1, wherein the opening in the housing comprises a tapered opening that tapers along a direction into the housing.

7. The wearable electronic device of claim 6, wherein the tapered opening comprises a ledge, and wherein the interface component comprises a protrusion that is adhesively attached to the ledge.

8. The wearable electronic device of claim 1, wherein the interface component of the identifier component is integrally formed with the housing and wherein the outer surface of the interface component is co-finished with the surface of the recess.

9. The wearable electronic device of claim 8, wherein the interface component is formed from a cured adhesive material or an injection molded thermosetting polymer.

10. The wearable electronic device of claim 8, wherein the interface component is formed from a plastic plug and a thermosetting polymer.

11. The wearable electronic device of claim 1, wherein the interface component comprises a cap for the identifier component.

12. The wearable electronic device of claim 1, wherein the identifier component comprises a near-field communications component having at least one antenna disposed at least partially within the interface component.

13. The wearable electronic device of claim 1, wherein the predetermined amount of fluid pressure is greater than three bar.

14. An identifier component for an electronic device, the identifier component comprising:
   an interface component that is configured to be disposed in an opening in a housing of the electronic device, wherein the interface component comprises an outer surface configured to form portion of a surface of a recess in the housing of the electronic device, and is configured to seal an internal cavity within the housing of the electronic device against a predetermined amount of fluid pressure on the outer surface of the interface component,
   wherein the identifier component is configured obtain a characteristic of a strap for the electronic device when a portion of the strap is within the recess.

15. The identifier component of claim 14, wherein a first part of the interface component is configured to be attached to a ledge of the opening in the housing by an adhesive film, and wherein the adhesive film is configured to form a dam against an adhesive for attaching a second part of the interface component to the housing within the opening.

16. The identifier component of claim 14, further comprising:
   a gasket that extends around a periphery of the interface component, wherein the interface component is configured to be attached to the housing within the opening by an adhesive that contacts the gasket.

17. The identifier component of claim 14, wherein the interface component is formed from a plastic plug and a thermosetting polymer.

18. A housing for an electronic device, the housing comprising:
   a first portion that defines an internal cavity; and
   an edge having a recess with a surface,
   wherein a portion of the surface of the recess is formed from an outer surface of an interface component of an identifier component for the electronic device, wherein the identifier component is configured obtain a characteristic of a strap for the electronic device when a portion of the strap is within the recess, and wherein the interface component is configured to seal the internal cavity against a predetermined amount of fluid pressure within the recess.

19. The housing of claim 18, further comprising an opening adjacent the recess, wherein the interface component is mounted in the opening, and the opening comprises a tapered opening that tapers along a direction into the housing.

20. The housing of claim 18, wherein the interface component of the identifier component is integrally formed with the housing and wherein the outer surface of the interface component is co-finished with the surface of the recess.

* * * * *